US010261322B2

(12) United States Patent
Takagi et al.

(10) Patent No.: US 10,261,322 B2
(45) Date of Patent: Apr. 16, 2019

(54) VIRTUAL IMAGE DISPLAY APPARATUS

(71) Applicant: SEIKO EPSON CORPORATION, Tokyo (JP)

(72) Inventors: Masayuki Takagi, Matsumoto (JP); Takahiro Totani, Suwa (JP); Takashi Takeda, Suwa (JP); Akira Komatsu, Tatsuno-machi (JP); Toshiaki Miyao, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 89 days.

(21) Appl. No.: 15/381,859

(22) Filed: Dec. 16, 2016

(65) Prior Publication Data
US 2017/0184855 A1 Jun. 29, 2017

(30) Foreign Application Priority Data

Dec. 25, 2015 (JP) ................. 2015-253153
Oct. 31, 2016 (JP) ................. 2016-212637

(51) Int. Cl.
F21V 8/00 (2006.01)
H04N 9/31 (2006.01)
G02B 27/00 (2006.01)
G02B 27/01 (2006.01)

(52) U.S. Cl.
CPC ....... *G02B 27/0172* (2013.01); *G02B 6/0001* (2013.01); *G02B 6/002* (2013.01); *G02B 6/0045* (2013.01); *H04N 9/3141* (2013.01); *H04N 9/3152* (2013.01); *G02B 6/0055* (2013.01); *G02B 27/0018* (2013.01); *G02B 2027/013* (2013.01); *G02B 2027/0121* (2013.01); *G02B 2027/0178* (2013.01)

(58) Field of Classification Search
CPC ............ G02B 27/0172; G02B 27/0018; G02B 6/0001; G02B 6/002; G02B 6/0045; G02B 6/0055; G02B 2027/0121; G02B 2027/013; G02B 2027/0178; H04N 9/3141; H04N 9/3152
See application file for complete search history.

(56) References Cited

U.S. PATENT DOCUMENTS 9,915,823 B1 * 3/2018 Kress ................. G02B 27/0172
2016/0178909 A1   6/2016 Komatsu et al.

FOREIGN PATENT DOCUMENTS

JP       2015-072438 A    4/2015

* cited by examiner

Primary Examiner — Michael E Teitelbaum
(74) Attorney, Agent, or Firm — Oliff PLC

(57) ABSTRACT

In a connection portion connecting a first reflective surface and a second reflective surface, the first reflective surface positioned relatively on an incidence side of video light is made to protrude toward an observer side beyond the second reflective surface positioned relatively on an emission side of video light, and a connection surface which is a surface of the connection portion is shaped to extend from a side close to the observer toward a side away from the observer between the first reflective surface and the second reflective surface.

7 Claims, 15 Drawing Sheets

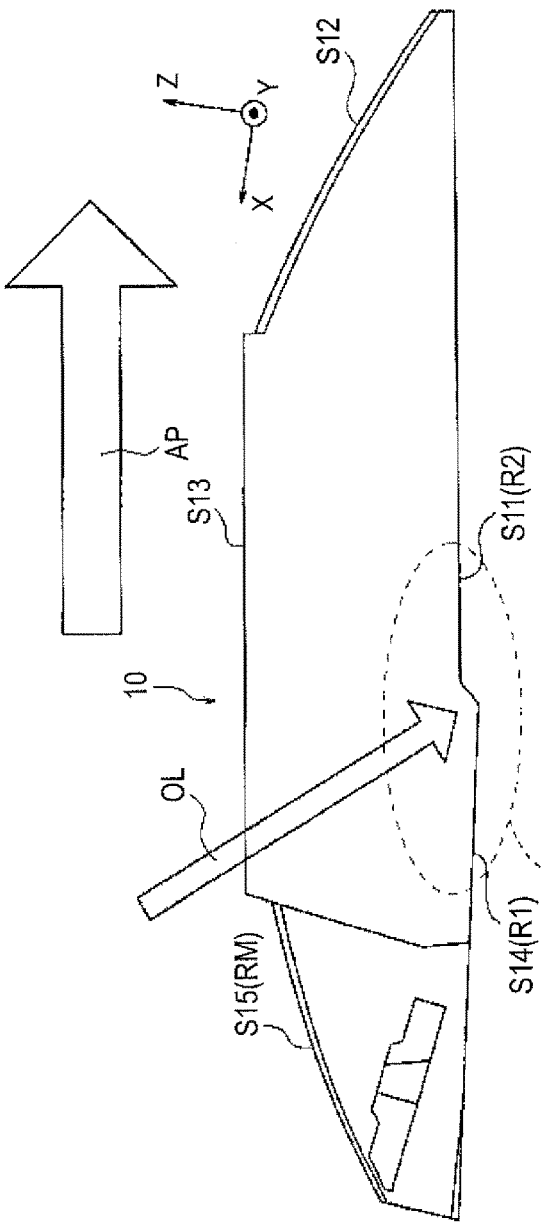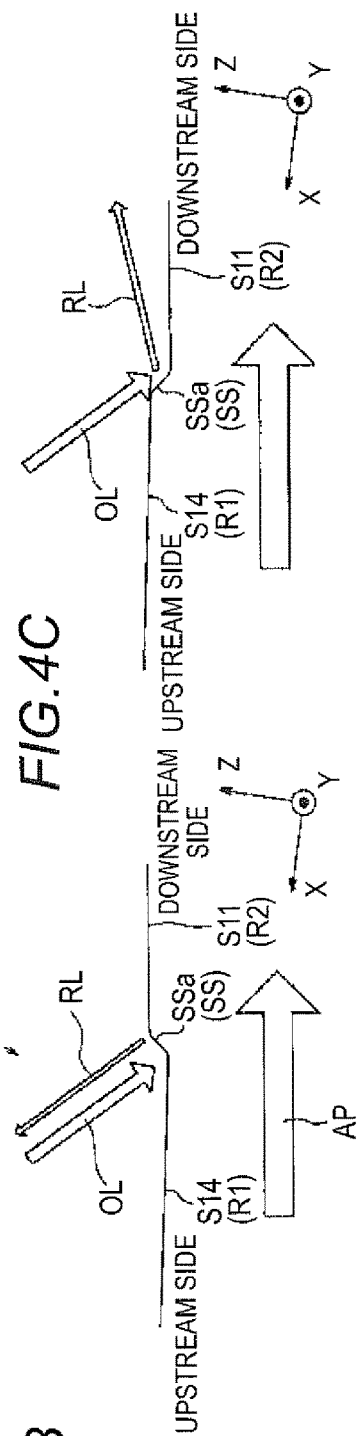

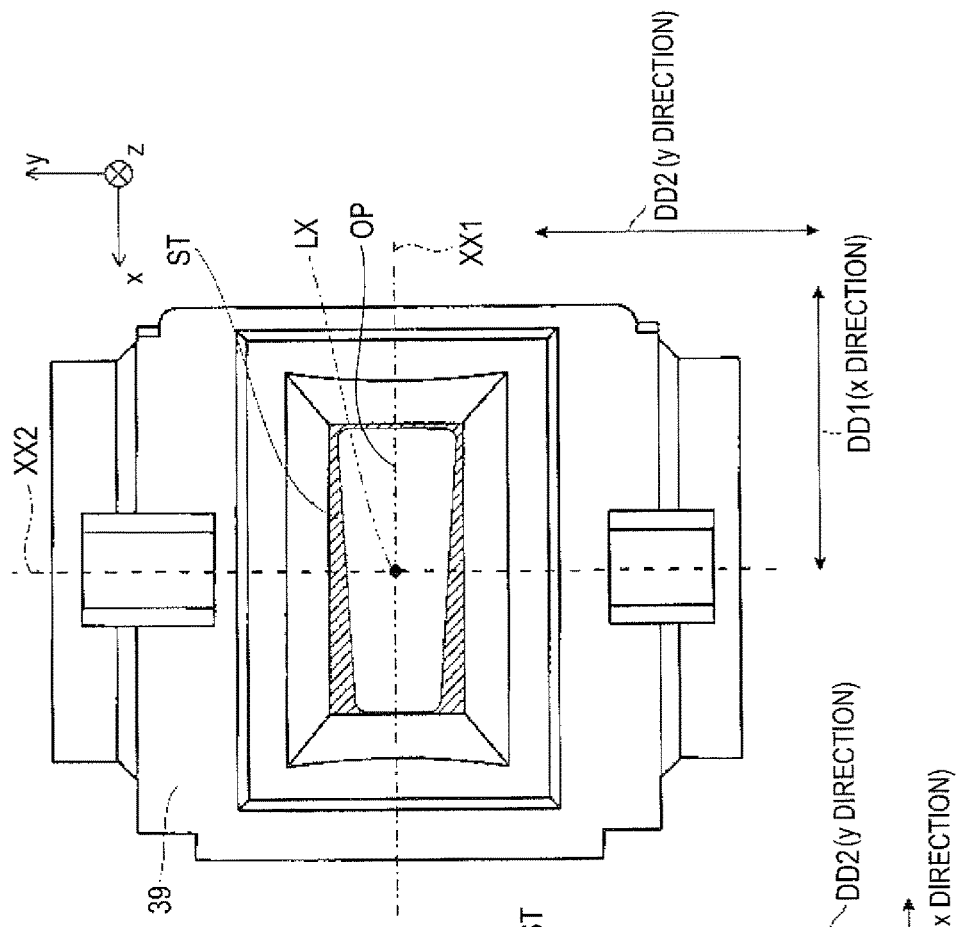
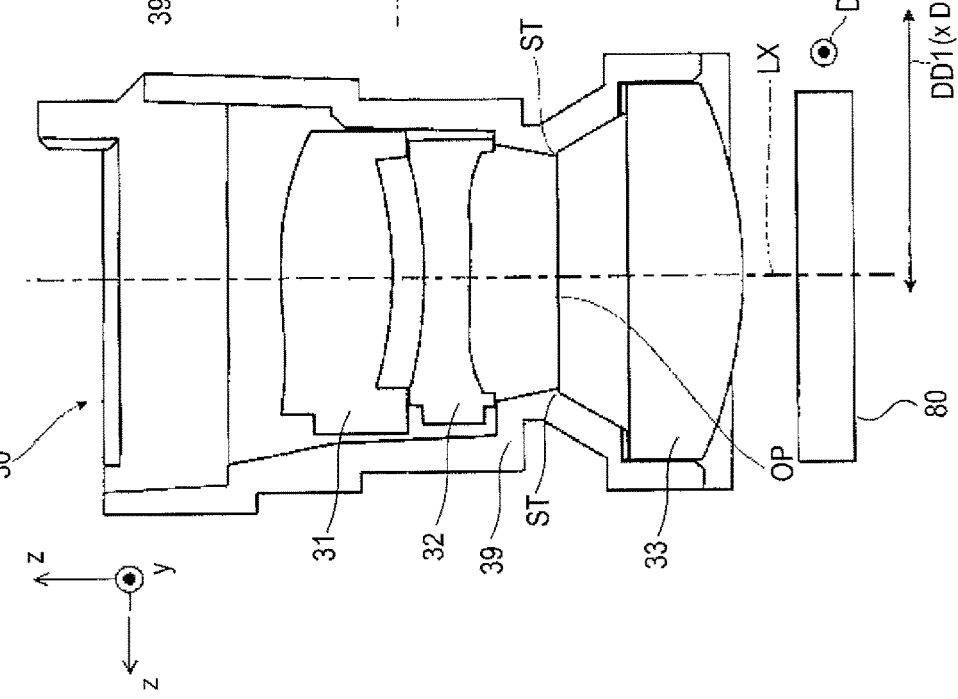

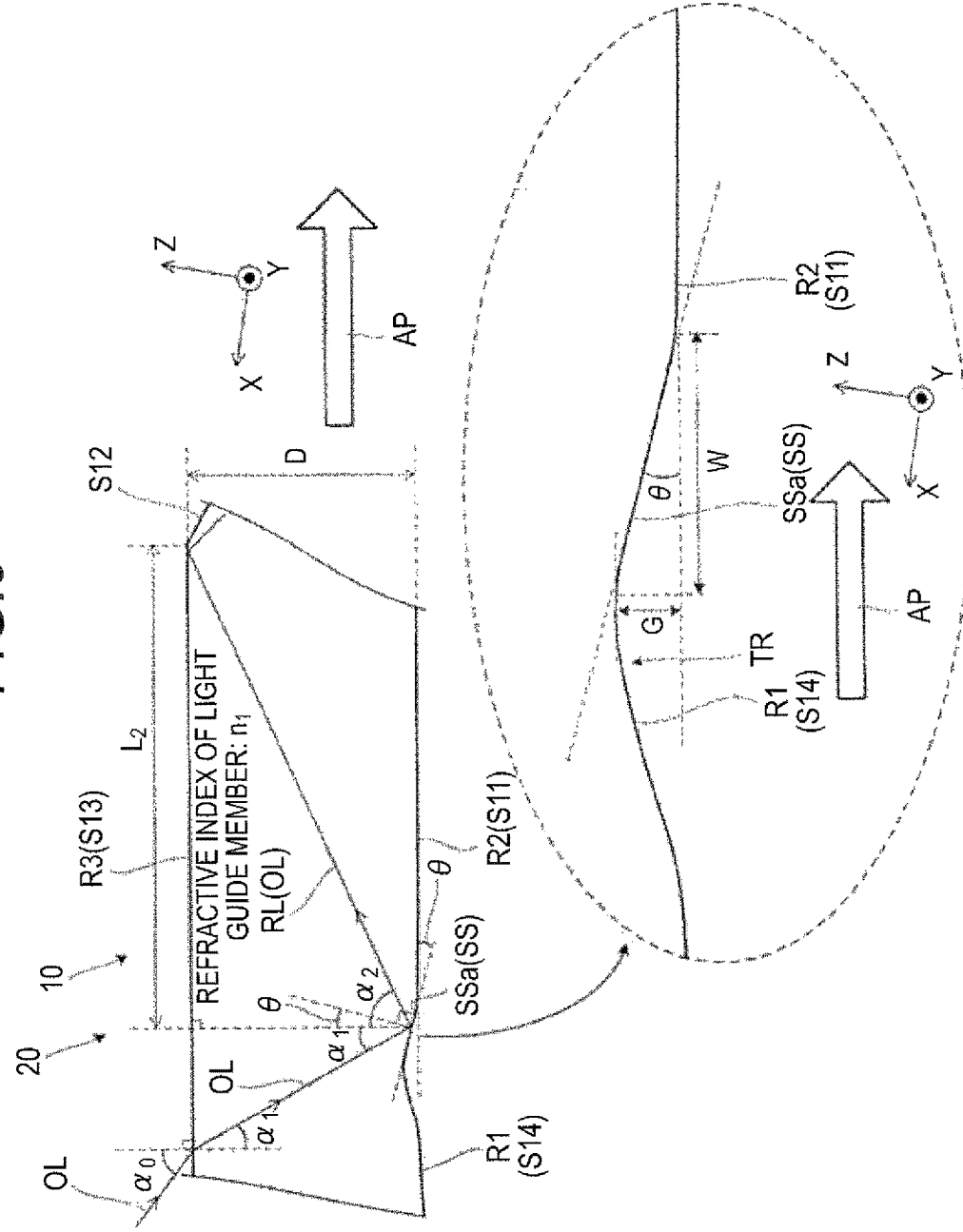

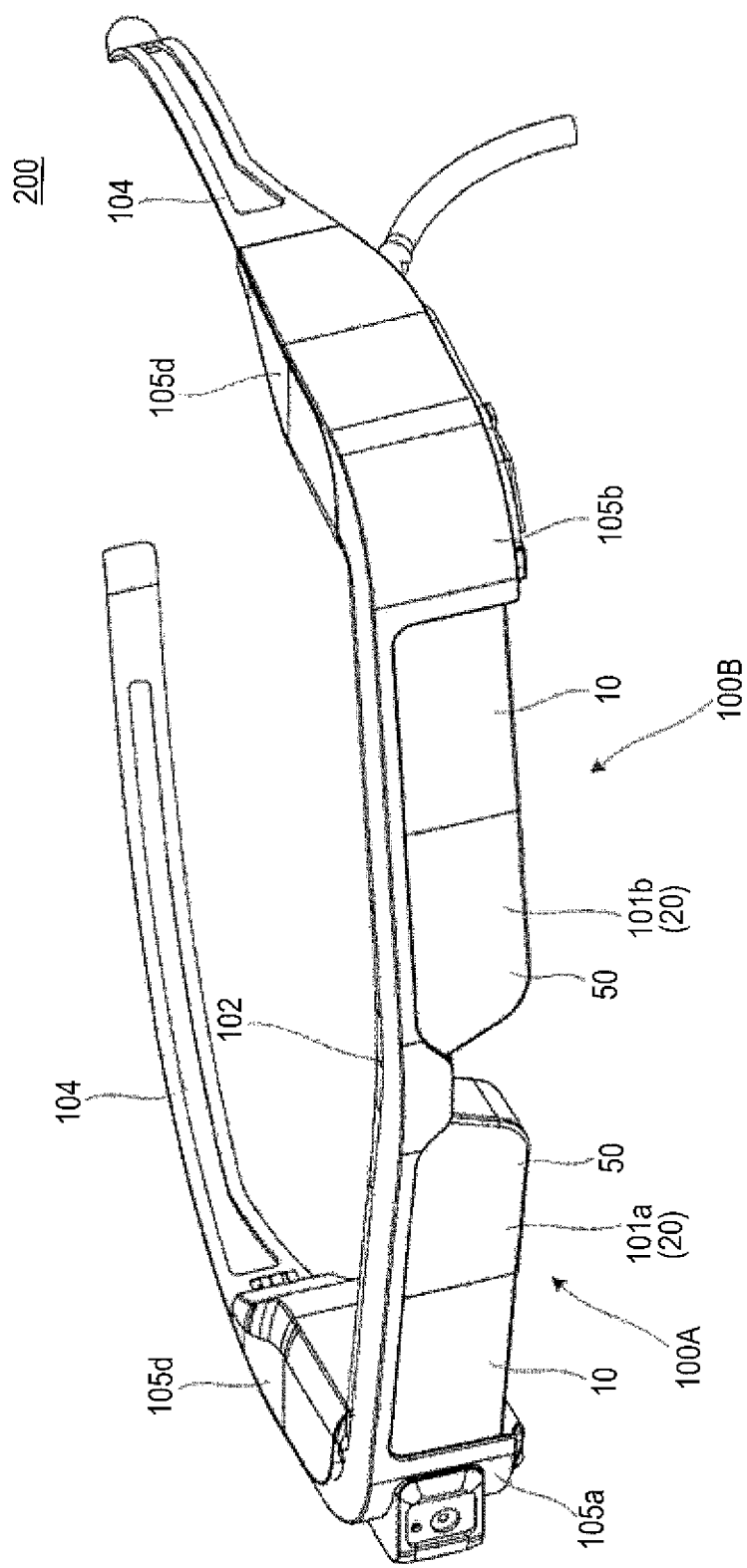

VIRTUAL IMAGE DISPLAY APPARATUS

BACKGROUND

1. Technical Field

The present invention relates to a virtual image display apparatus which provides video formed by an image display device (video element) to an observer.

2. Related Art

Various optical systems have been proposed as an optical system which is assembled in a virtual image display apparatus, such as a head-mounted display (hereinafter, referred to as an HMD) mounted to the head of an observer (see JP-A-2015-72438).

As such a virtual image display apparatus, for example, a virtual image display apparatus is known in which a light guide member guiding video light by reflecting video light by a plurality of reflective surfaces is applied as a see-through optical system causing image light (video light) to be visually recognized and allowing an observer to visually recognize an outside world image (for example, see JP-A-2015-72438). In JP-A-2015-72438 or the like, there are adjacent surfaces (for example, in JP-A-2015-72438, a first surface S11 and a fourth surface S14 of FIGS. 3A to 3C) as a plurality of reflective surfaces.

However, in the above-described see-through HMD or the like, outside light entering the light guide member is unintentionally reflected inside the light guide member, is guided inside the light guide member, and is visually recognized by the observer, that is, is likely to become ghost light. In particular, in a connection portion of adjacent reflective surfaces out of the light guide member, some components of outside light entering the light guide member may be reflected and guided in a light guide direction (a direction toward an optical path downstream side of video light) according to the shape of the connection portion. In particular, in order to achieve reduction in size of the apparatus, appropriate processing of an excessive component relating to ghost light becomes important.

SUMMARY

An advantage of some aspects of the invention is to provide a see-through virtual image display apparatus capable of suppressing generation of ghost light described above and securing satisfactory image visibility.

A virtual image display apparatus according to a first aspect of the invention includes a video element which generates video light, and a light guide member which has a plurality of reflective surfaces, guides video light from the video element by reflecting video light by an inner surface thereof, and causes video light and outside world light to be visually recognized in an overlapping manner. The light guide member has a first reflective surface and a second reflective surface positioned on an emission side of video light from the first reflective surface as reflective surfaces provided adjacent to each other on a side opposite to an incidence side of outside world light among the plurality of reflective surfaces, and in a connection portion connecting the first reflective surface and the second reflective surface, the first reflective surface is made to protrude beyond the second reflective surface.

In the virtual image display apparatus, in the connection portion which connects the first reflective surface and the second reflective surface as a pair of adjacent reflective surfaces on the observer side among a plurality of reflective surfaces guiding the video light, the first reflective surface is made to protrude beyond the second reflective surface positioned on the emission side of video light from the first reflective surface. In other words, in a case where the virtual image display apparatus is mounted, a surface on an optical path upstream side of video light protrudes to the observer side beyond a surface on an optical path downstream side. In this case, the connection portion connecting both reflective surfaces is shaped to extend from aside close to the observer toward a side away from the observer between the first reflective surface and the second reflective surface. With this, even if outside light which is a component entering the light guide member from a side opposite to the observer toward the observer side enters the connection portion and a part of outside light is reflected, the reflected component is reflected as it is, is directed outward of the light guide member or toward the optical path upstream side of video light, and is not or hardly directed toward the optical path downstream side. That is, it is possible to prevent outside light from being guided to the optical path downstream side inside the light guide member and visually recognized by the observer to become ghost light, and to secure satisfactory image visibility.

A virtual image display apparatus according to a second aspect of the invention includes a video element which generates video light, and a light guide member which has a plurality of reflective surfaces, guides video light from the video element by reflecting video light by an inner surface thereof, and causes video light and outside world light to be visually recognized in an overlapping manner. The light guide member has a first reflective surface and a second reflective surface positioned on an emission side of video light from the first reflective surface as reflective surfaces provided adjacent to each other on a side opposite to an incidence side of outside world light among the plurality of reflective surfaces, and has a connection portion connecting the first reflective surface and the second reflective surface. In a location where the first reflective surface is more recessed than the second reflective surface to form a recess portion, the connection portion forms an inclined connection surface maintained at an inclination angle equal to or less than a predetermined value with respect to the second reflective surface according to the recess portion.

In the virtual image display apparatus, the connection portion which connects the first reflective surface and the second reflective surface as a pair of adjacent reflective surfaces on the observer side among a plurality of reflective surfaces guiding video light forms the inclined contact surface which is maintained at the inclination angle equal or less than the predetermined value with respect to the second reflective surface according to the recess portion formed to be more recessed in the first reflective surface than the second reflective surface. With this, even if outside light which is a component entering the light guide member from a side opposite to the observer toward the observer side enters the inclined connection surface of the connection portion and a part of outside light is reflected, by adjusting an optical path of the reflected component, it is possible to prevent the component from being visually recognized by the observer to become ghost light, and to secure satisfactory image visibility.

BRIEF DESCRIPTION OF THE DRAWINGS

The invention will be described with reference to the accompanying drawings, wherein like numbers reference like elements.

FIG. 3C is a side view of the light guide member of FIG. 3A.

FIG. 4A is a diagram illustrating an example of entrance of outside light into a connection portion of the light guide member, FIG. 4B is a diagram conceptually showing a state where a part of FIG. 4A is enlarged for description of a reflected component of outside light, and FIG. 4C is a diagram of a comparative example of FIG. 4B.

FIG. 5A is a sectional view showing the configuration of a projection optical system, and FIG. 5B is a front view of a lens barrel of the projection optical system.

FIG. 9 is a diagram illustrating an example of entrance of outside light into a connection portion of the light guide member.

FIG. 15 is a perspective view briefly illustrating the appearance of a virtual image display apparatus of a modification example.

DESCRIPTION OF EXEMPLARY EMBODIMENTS

First Embodiment

Hereinafter, a virtual image display apparatus according to a first embodiment of the invention will be described in detail referring to FIG. 1 and the like.

Figure 1:
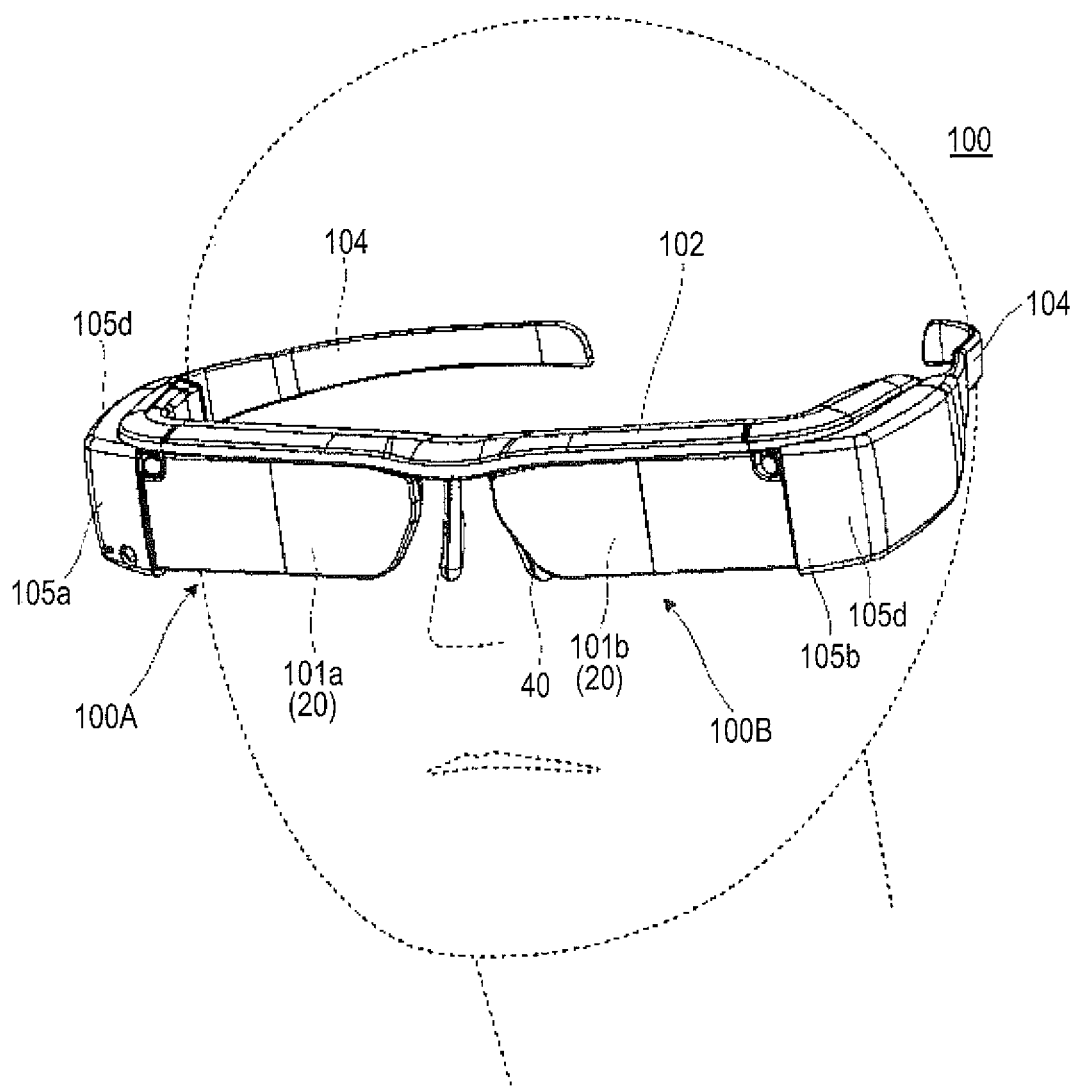
FIG. 1 is a perspective view briefly illustrating the appearance of an example of a virtual image display apparatus according to a first embodiment.
Figure 2:
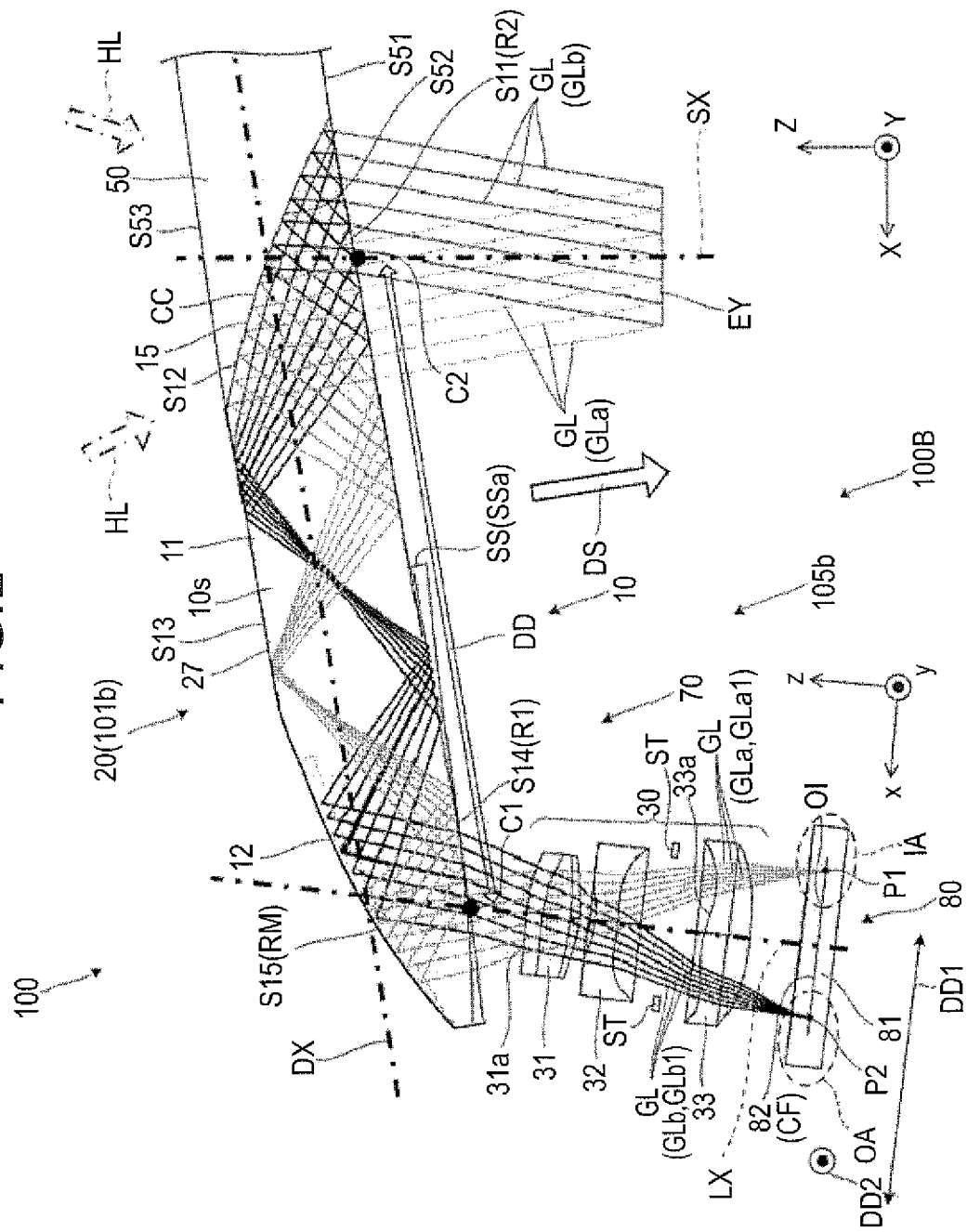
FIG. 2 is a plan view showing an optical path of a main body portion constituting the virtual image display apparatus.

As shown in FIG. 1, a virtual image display apparatus 100 of this embodiment is a head-mounted display which has an appearance like glasses, and is a virtual image display apparatus which can allow an observer or a user who the virtual image display apparatus 100 is mounted to visually recognize image light (video light) by a virtual image and allow the observer to visually recognize or observe an outside world image in see-through vision. The virtual image display apparatus 100 includes first and second optical members 101a and 101b which cover the front of the eyes of the observer in see-through vision, a frame part 102 which supports both optical members 101a and 101b, and first and second image forming main body parts 105a and 105b which are attached to portions from both of left and right ends of the frame part 102 to rear temple parts (temples) 104. A first display device 100A in which the first optical member 101a and the first image forming main body part 105a on the left side of the drawing are combined is a part which forms a virtual image for a right eye, and functions as a virtual image display apparatus singly. A second display device 100B in which the second optical member 101b and the second image forming main body part 105b on the right side of the drawing are combined is a part which forms a virtual image for a left eye, and functions as a virtual image display apparatus singly. When comparing FIG. 2 with FIG. 1, it is understood that, for example, the first and second image forming main body parts 105a and 105b are respectively constituted of an image display device 80 (video element) including a projection lens 30 as a projection optical system and an image generation unit 81. While FIG. 2 shows a display device for a left eye, and a display device for a right eye is not shown, the display device for a right eye has the same structure. In addition to the above configuration, a nose receiving part 40 which plays a role in supporting the frame part 102 by abutting on the nose of the observer is provided.

As shown in FIG. 2, the display device 100B can be regarded as including a projection see-through device 70 which is an optical system for projection, and the image display device 80 which forms video light. The projection see-through device 70 includes the second optical member 101b or a light guide device 20, and the projection lens 30 for imaging, and plays a role in projecting an image formed by the image display device 80 onto the eyes of the observer as a virtual image. In other words, the projection see-through device 70 is a virtual image optical system which guides light from an image surface OI as a surface, from which image light (video light) formed on the image display device 80 is emitted, and allows the observer to visually recognize a virtual image, and is an imaging optical system which reimages on the retina of the observer. The second optical member 101b or the light guide device 20 is constituted of a light guide member 10 for light guide and see-through vision and a light transmissive member 50 for see-through vision. The second image forming main body part 105b is constituted of the image display device 80 and the projection lens 30. The image surface OI is a panel surface indicating the panel position of the panel constituting the image display device 80. In a case where the image display device 80 is a self-luminous illumination, the image surface OI is also called a light emission surface.

An optical axis reference of the above-described optical systems is determined as follows. First, a center optical axis of the projection lens 30 is called a lens optical axis (projection optical system optical axis) LX. A center axis extending in the light guide direction of the light guide member 10 is called a light guide axis DX. The light guide axis DX is an axis passing through the center of the flat plate-shaped light guide member 10 and extending along the flat plate shape. On a light emission side of the light guide member 10, a center axis anticipated as a reference of a sight line of the observer is called a sight line axis SX. The sight line axis SX is an axis extending from a center position of an eye anticipated position EY anticipated as the position of the eye (hereinafter, also simply referred to as "eye EY" including a case where the eye EY is actually placed in the anticipated eye position EY) toward the center of the light emission range of the light guide member 10. In the light guide member 10, an intersection point between a light incidence part (a second light guide part 12 described below) provided on a light incidence side and the lens optical axis LX of the projection lens 30 is called an intersection point C1, and an intersection point between a light emission part (a first light guide part 11 described below) provided on the light emission side of the light guide member 10 and the sight line axis SX is called an intersection point C2. It is assumed that the distance (interval) between the intersection point C1 and the intersection point C2 indicated by a two-way arrow AA in the drawing is equal to or less than 48 mm. The sight line axis SX is inclined at about 7° (more accurately, 6.7°) with respect to the lens optical axis LX. The sight line axis SX is inclined at about 10° from a vertical state to the light guide axis DX. That is, the sight line axis SX and the light guide axis DX intersect so as to have an angle of reflection of about 80°. In the above-described case, the lens optical axis LX and the light guide axis DX intersect so as to have an angle of reflection of about 106.7°.

In the image display device 80, the image surface OI is a surface vertical to the lens optical axis LX, and the lens optical axis LX passes through the center of the image surface OI. An x direction (a direction corresponding to an X direction) which is a horizontal direction in a surface parallel to the image surface OI is called a first direction DD1, and a y direction (a direction corresponding to a Y direction) which is a vertical direction is called a second direction DD2. A z direction is a normal direction of the image surface OI and a direction in which the lens optical axis LX extends. In this embodiment, the emission angle of a light flux of video light emitted from the image surface OI is asymmetric with respect to the center line (lens optical axis LX) of the image surface OI right and left (x direction). The emission angle of the light flux of video light is symmetric with respect to the center of the image surface OI in an up-down direction (y direction).

The image display device 80 has the image generation unit 81 which forms the image surface OI constituted of pixels in a matrix by a self-luminous type illumination including an organic EL (organic EL panel) as a light source, an intensity distribution control unit 82 which is provided at the immediate downstream of the image generation unit 81 and controls intensity distribution of respective components of video light GL emitted from the image surface OI of the image generation unit 81, and additionally, a drive control unit (not shown) which controls the operations of the image generation unit 81 and the like. Though the details will be described below (see FIGS. 7A and 7B), a color filter layer CF provided at the immediate downstream of the image generation unit 81 functions as the intensity distribution control unit 82, and in regard to video light GL, the emission angle of component light emitted from the periphery side of the image surface OI is adjusted. For example, among partial light fluxes of video light GL, a partial light flux GLa emitted from the inside relatively close to a human body (observer) and a partial light flux GLb emitted from the outside relatively away from the human body have different emission angles. The partial light fluxes GLa and GLb mean components to reach the eye of the observer out of the light flux constituting video light GL.

The projection lens 30 is a projection optical system which projects video light GL emitted from the image display device 80 toward the light guide device 20. In this embodiment, in particular, a lens having a non-axisymmetric aspheric surface (or free-form surface) is provided on a side close to the image display device 80, whereby it is possible to reduce the size of the entire optical system. A stop ST is additionally provided to the projection lens 30. The stop ST forms a non-line-symmetric quadrangular opening, and shields the respective components of the partial light flux GLa and the like of video light GL asymmetrically emitted as described above as appropriate. The detailed shape, structure, and the like of the stop ST will be described below referring to FIGS. 5A and 5B or the like.

As described above, the light guide device 20 is constituted of the light guide member 10 for light guide and see-through vision and the light transmissive member 50 for see-through vision. The light guide member 10 is a part of the prism-shaped light guide device 20, and an integrated member, but may be regarded to be divided into the first light guide part 11 (light emission part) on the light emission side and the second light guide part 12 (light incidence part) on the light incidence side. The light transmissive member 50 is a member (auxiliary optical block) which assists the see-through function of the light guide member 10, and is integrally fixed to the light guide member 10 into one light guide device 20.

Hereinafter, the role of the projection see-through device 70 as a virtual image optical system, that is, the light guide device 20 and the projection lens 30 will be described in detail referring to FIG. 2.

The projection lens 30 is an optical system which allows entrance of video light GL from the image display device 80 and projects light, and is a projection optical system including, as constituent elements, three optical elements (first to third lenses) 31 to 33 along the lens optical axis LX as a projection optical system optical axis. Each of the optical elements 31 to 33 is constituted of an aspheric lens including both of a non-axisymmetric aspheric surface and an axisymmetric aspheric surface, and forms an intermediate image corresponding to a display image of the image generation unit 81 inside the light guide member 10 in cooperation with a part of the light guide member 10. In this embodiment, in particular, not only a lens surface 31a on the light emission side among the respective lens surfaces of the first lens 31 provided on the light emission side, but also a lens surface 33a on the light emission side among the respective lens surfaces of the third lens 33 provided on the light incidence side are non-axisymmetric aspheric surfaces. The first to third lenses 31 to 33 constituting the projection lens 30 are stored and supported inside the second image forming main body part 105b, for example, by a lens barrel (see FIGS. 5A and 5B). The projection lens 30 has the stop ST between the second lens 32 and the third lens 33 among the first to third lenses 31 to 33. The stop ST is provided in a location where video light GL is superimposed the most in the projection lens 30, and narrows light as appropriate. Since the lens surfaces include a non-axisymmetric aspheric surface, the components of the respective partial light fluxes are bent in a complicated manner. The stop ST has the shape or structure corresponding to the components.

As described above, the light guide device 20 is constituted of the light guide member 10 and the light transmissive member 50. Of these, the light guide member 10 has a portion on the center side near the nose (in front of the eye) linearly extending in plan view. Of the light guide member 10, the first light guide part 11 provided on the center side near the nose, that is, on the light emission side has a first surface S11, a second surface S12, and a third surface S13 as side surfaces having optical functions, and the second light guide part 12 on the periphery side apart from the nose, that is, on the light incidence side has a fourth surface S14 and a fifth surface S15 as side surfaces having optical functions. Of these, the first surface S11 and the fourth surface S14 are continuously adjacent, and the third surface S13 and the fifth surface S15 are continuously adjacent. The second surface S12 is provided between the first surface S11 and the third surface S13, and the fourth surface S14 and the fifth surface S15 are adjacent at a large angle. The first surface S11 and the third surface S13 provided to face each other have planar shapes nearly parallel to each other. Other surfaces having optical functions, that is, the second surface S12, the fourth surface S14, and the fifth surface S15 are non-axisymmetric curved surfaces (free-form surfaces).

From the viewpoint of suppressing ghost light in see-through vision, a plurality of reflective surfaces constituting the light guide member 10 are specified by another way of thinking. Specifically, among the surfaces S11 to S15 as a plurality of reflective surfaces in the light guide member 10, the fourth surface S14 and the first surface S11 as a pair of reflective surfaces provided adjacent to each other on the observer side are specified as follows. The fourth surface S14 positioned relatively on the incidence side of video light GL is a first reflective surface R1, and the first surface S11 positioned relatively on the emission side of video light is a second reflective surface R2. A portion connecting the first reflective surface R1 and the second reflective surface R2 is a connection portion SS, and a surface of the connection portion SS, that is, a surface continuously and smoothly connecting the first reflective surface R1 and the second reflective surface R2 is a connection surface SSa. In this case, the first reflective surface R1 on the incidence side is a free-form surface (fourth surface S14), and the second reflective surface R2 on the emission side is a flat surface (first surface S11). In this embodiment, the first reflective surface R1 protrudes toward the observer side beyond the second reflective surface R2 in the connection portion SS. The sentence that one surface of two adjacent surfaces protrudes toward the observer beyond the other surface in the connection portion means that, as a typical example of the illustration, when a normal direction of a surface (reference surface) including the second reflective surface R2 as a flat surface is a protrusion direction DS, the first reflective surface R1 protrudes toward the observer side compared to the second reflective surface R2 in the protrusion direction DS. In addition, one surface protruding toward the observer side "beyond" the other surface means that there is no location where the second reflective surface R2 protrudes from the first reflective surface R1 over the entire connection portion SS in the protrusion direction DS (see FIGS. 3A to 3C). It should be noted that the protrusion direction DS is called a thickness direction.

Though the details will be described below referring to FIGS. 3A to 3C and 4A to 4C, the light guide member 10 has the shape and structure satisfying the conditions described above in the protrusion direction (thickness direction) DS, whereby it is possible to suppress the generation of ghost light due to outside light inside the light guide member 10.

Returning to FIG. 2, as described above, the light transmissive member 50 is integrally fixed to the light guide member 10 into one light guide device 20, and is a member (auxiliary optical block) which assists the see-through function of the light guide member 10. The light transmissive member 50 has a first transmissive surface S51, a second transmissive surface S52, and a third transmissive surface S53 as side surfaces having optical functions. The second transmissive surface S52 is provided between the first transmissive surface S51 and the third transmissive surface S53. The first transmissive surface S51 is on a surface as an extension of the first surface S11 of the light guide member 10, the second transmissive surface S52 is a curved surface joined to and integrated with the second surface S12 by an adhesive layer CC, and the third transmissive surface S53 is on a surface as an extension of the third surface S13 of the light guide member 10. Of these, the second transmissive surface S52 and the second surface S12 of the light guide member 10 are integrated by joining through the thin adhesive layer CC, and thus, have shapes with nearly the same curvature.

In particular, the surfaces S14 and S15 other than the first surface S11 to the third surface S13 among a plurality of surfaces constituting the light guide member 10 include at least one point different in sign of curvature depending on a direction in at least one free-form surface. With this, it is possible to reduce the size of the light guide member 10 while controlling the light guide of video light accurately.

While a main body 10s in the light guide member 10 exhibits a high light transmission property in a visible region and is an integrated article, as described above, the light guide member 10 may be regarded to be functionally divided into the first light guide part 11 and the second light guide part 12. The first light guide part 11 enables light guide and emission of video light GL and enables see-through vision of outside world light HL. The second light guide part 12 enables incidence and light guide of video light GL.

In the first light guide part 11, the first surface S11 functions as a refraction surface which emits video light GL outside the first light guide part 11 and functions as a total reflective surface which totally reflects video light GL on the inner surface side. The first surface S11 is provided in front of an assumed eye position EY (eye EY), and is formed to have a planar shape as described above. It should be noted that the first surface S11 is a surface which is formed by a hard coat layer 27 applied to the surface of the main body 10s.

On the second surface S12, a half-mirror layer 15 is attached to the surface of the main body 10s. The second surface S12 functions as a semi-transmissive reflective surface (semi-transmissive reflective part) which reflects video light GL and makes outside world light HL pass therethrough.

The third surface S13 functions as a total reflective surface which totally reflects video light GL on the inner surface side. The third surface S13 is provided nearly in front of the eye EY and has a planar shape like the first surface S11. The first surface S11 and the third surface S13 are surfaces parallel to each other, whereby, when outside world light HL is viewed through the first surface S11 and the third surface S13, a diopter scale becomes 0, and in particular, variable magnification does not occur. It should be noted that the third surface S13 is a surface which is formed by the hard coat layer 27 applied to the surface of the main body 10s.

In the second light guide part 12, the fourth surface S14 functions as a total reflective surface which totally reflects video light GL on the inner surface side. The fourth surface S14 also functions as a refraction surface which makes video light GL enter the second light guide part 12. That is, the fourth surface S14 doubles as a light incidence surface which makes video light GL enter the light guide member 10 from the outside, and a reflective surface which makes video light GL propagate through the light guide member 10. The fourth surface S14 is a surface which is formed by the hard coat layer 27 applied to the surface of the main body 10s.

In the second light guide part 12, the fifth surface S15 is formed by forming a light reflection film RM formed of an inorganic material on the surface of the main body 10s, and functions as a reflective surface.

The light transmissive member 50 exhibits a high light transmission property in a visible region, and a main body portion of the light transmissive member 50 is formed of a material having nearly the same refractive index as the main body 10s of the light guide member 10. The light transmissive member 50 is formed by hard coat deposition along with the main body 10s in a state where the main body portion is joined to the main body 10s of the light guide member 10. That is, similarly to the light guide member 10, in the light transmissive member 50, a hard coat layer 27 is applied to the surface of the main body portion. The first transmissive surface S51 and the third transmissive surface S53 are surfaces which are formed of the hard coat layer 27 on the surface of the main body portion.

The light guide device 20 is formed by joining abase material to be the light guide member 10 and the light transmissive member 50 and then coating the bonded base material by dipping processing. That is, the hard coat layer 27 of the light guide member 10 is provided in the entire light guide device 20 along with the light transmissive member 50.

As described above, video light from the image generation unit 81 is guided by reflection of five times from the first surface S11 to the fifth surface S15 including total reflection of at least two times inside the light guide member 10. With this, it is possible to achieve both of the display of video light GL and see-through vision of allowing outside world light HL to be visually recognized, and to correct aberration of video light GL.

Hereinafter, an optical path of video light GL or the like in the virtual image display apparatus 100 will be described. Video light GL emitted from the image display device 80 passes through the respective lenses 31 to 33 constituting the projection lens 30, and expected astigmatism is given while video light GL converges. Video light GL enters the fourth surface S14 having positive refractive power provided in the light guide member 10. The astigmatism is offset while light passes through the respective surfaces of the light guide member 10, and video light is finally emitted toward the eyes of the observer in an expected state.

Video light GL having entered and passed through the fourth surface S14 of the light guide member 10 converges and travels, when passing through the second light guide part 12, is reflected by the fifth surface S15 having comparatively weak positive refractive power, enters the fourth surface S14 from the inside again, and is then reflected.

Video light GL reflected by the fourth surface S14 of the second light guide part 12 enters and is totally reflected by the third surface S13 substantially having no refractive power in the first light guide part 11, and enters and is totally reflected by the first surface S11 substantially having no refractive power.

Before and after passing through the third surface S13, video light GL forms an intermediate image in the light guide member 10. The image plane of the intermediate image corresponds to the image surface OI of the image generation unit 81.

While video light GL totally reflected by the first surface S11 enters the second surface S12 while being diverged, in particular, video light GL entering the half-mirror layer 15 is partially transmitted through and partially reflected by the half-mirror layer 15 and enters and passes through the first surface S11 again. The half-mirror layer 15 acts as having comparatively strong positive refractive power to video light GL to be reflected by the half-mirror layer 15. The first surface S11 acts as having no refractive power to video light GL passing therethrough.

Video light GL having passed through the first surface S11 enters the pupil of the eye EY of the observer or an equivalent position as a nearly parallel light flux. That is, the observer observes an image formed on the image generation unit 81 by video light GL as a virtual image.

Out of outside world light HL, a light component which enters a +X side from the second surface S12 of the light guide member 10 passes through the third surface S13 and the first surface S11 of the first light guide part 11, and at this time, almost no aberration or the like is generated since the third surface S13 and the first surface S11 are formed with planes nearly parallel to each other. That is, the observer observes an outside world image with no distortion over the light guide member 10. Similarly, out of outside world light HL, a light component which enters a −X side from the second surface S12 of the light guide member 10, that is, a light component which enters the light transmissive member 50 passes through the third transmissive surface S53 and the first transmissive surface S51 provided in the light transmissive member 50, and at this time, no aberration or the like is generated since the third transmissive surface S53 and the first transmissive surface S51 are formed with planes nearly parallel to each other. That is, the observer observes an outside world image with no distortion over the light transmissive member 50. Out of outside world light HL, alight component which enters the light transmissive member 50 corresponding to the second surface S12 of the light guide member 10 passes through the third transmissive surface S53 and the first surface S11, and at this time, no aberration or the like does not occur since the third transmissive surface S53 and the first surface S11 are formed with planes nearly parallel to each other. That is, the observer observes an outside world image with little distortion over the light transmissive member 50. The second surface S12 of the light guide member 10 and the second transmissive surface S52 of the light transmissive member 50 have nearly the same curved surface shape and nearly the same refractive index, and the gap between both surfaces is filled with the adhesive layer CC having nearly the same refractive index. That is, the second surface S12 of the light guide member 10 or the second transmissive surface S52 of the light transmissive member 50 does not act as a refraction surface to outside world light HL.

In a so-called see-through optical system described above, in general, leaking light or the like is likely to enter from the outside during light guide, and ghost light may be generated due to leaking light. In particular, in an optical system to which the plate-shaped light guide member 10 described above is applied, in a case of constituting a surface (for example, a surface on the observer side) on the same side of a plate-shaped surface portion by connecting two adjacent surfaces, a portion connecting the two surfaces is exposed to light from the outside, and a part of light may be guided in an unintended direction to generate ghost light. In contrast, in the virtual image display apparatus 100 of this embodiment, as described above, among a plurality of reflective surfaces constituting the light guide member 10, the first reflective surface R1 (fourth surface S14) and the second reflective surface R2 (first surface S11) have specific shapes and structures, whereby it is possible to suppress the generation of a component causing ghost light in the connection portion SS (connection surface SSa) connecting the first reflective surface R1 (fourth surface S14) and the second reflective surface R2 (first surface S11).

Hereinafter, the first reflective surface R1 (fourth surface S14) and the second reflective surface R2 (first surface S11) as a pair of adjacent reflective surfaces among a plurality of reflective surfaces constituting the light guide member 10 in this embodiment and the connection portion SS (connection surface SSa) connecting the first reflective surface R1 (fourth surface S14) and the second reflective surface R2 (first surface S11) will be described in detail referring to FIGS. 3A to 3C and 4A to 4C.

Figure 3A:
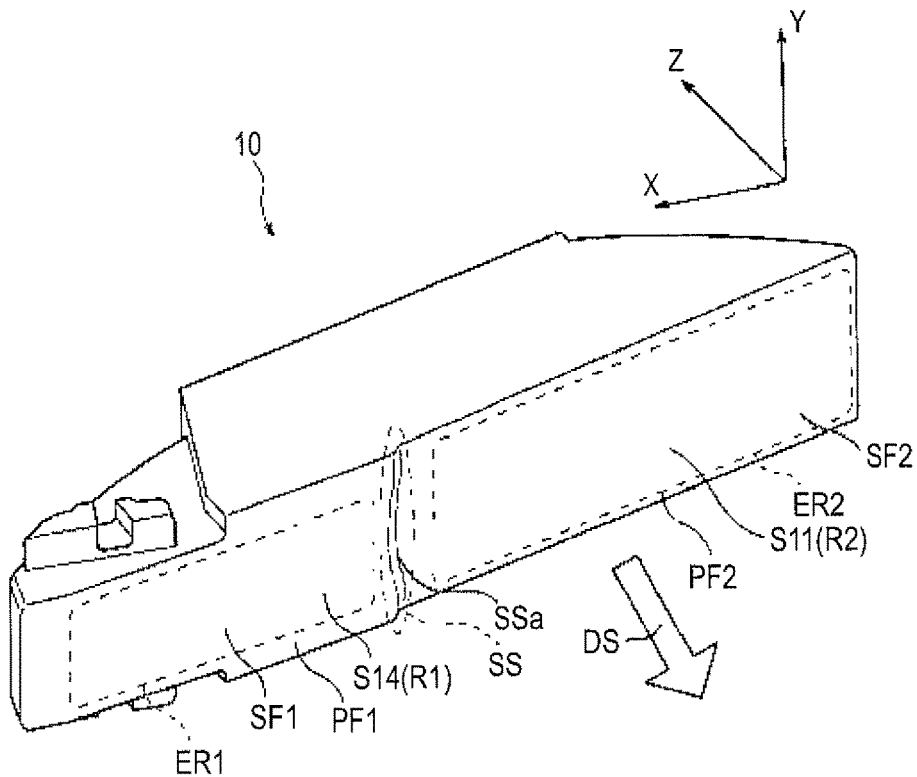
FIG. 3A is a perspective view showing the shape of the light guide member.
Figure 3B:
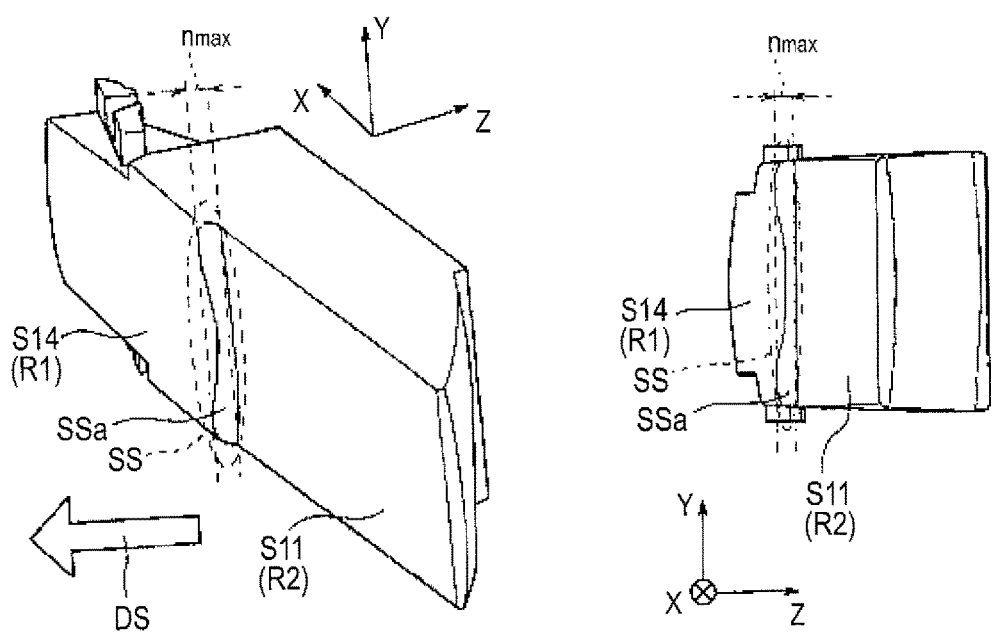
FIG. 3B is a perspective view of the light guide member of FIG. 3A when viewed from a different angel.

As described above and as shown in FIGS. 3A, 3B, and 3C, in the first reflective surface R1 and the second reflective surface R2, the first reflective surface R1 is positioned relatively on the incidence side of video light, and the second reflective surface R2 is positioned relatively on the emission side of video light. In other words, the first reflective surface R1 is on the optical path upstream side of video light GL from the second reflective surface R2. In this case, if a component which is directed from the optical path upstream side toward the optical path downstream side, that is, from the first reflective surface R1 side toward the second reflective surface R2 side due to leaking light (outside light) from the outside is generated, this component is considered to be likely to become ghost light. In this embodiment, the first reflective surface R1 and the second reflective surface R2 have shapes or structures capable of coping with this problem. Specifically, as described above and as shown in FIGS. 3A, 3B, and 3C in detail, in the connection portion SS, the first reflective surface R1 protrudes toward the observer side beyond the second reflective surface R2 in the protrusion direction (thickness direction) DS. That is, in the connection portion SS and the periphery thereof, the first reflective surface R1 constantly protrudes toward the observer side compared to the second reflective surface R2, and there is no portion where the second reflective surface R2 protrudes toward the observer side from the first reflective surface R1. With this, as shown in FIGS. 3A to 3C and 4A to 4C, in the connection portion SS, the connection surface SSa as a surface continuously and smoothly connecting the first reflective surface R1 and the second reflective surface R2 is shaped to extend from a side close to the observer toward a side away from the observer between the first reflective surface R1 and the second reflective surface R2, the inner surface of the connection surface SSa becomes a surface facing the optical path upstream side, and there is no location facing the optical path downstream side. As shown in FIGS. 3A to 3C, in the connection portion SS, the connection surface SSa has a maximum thickness $n_{max}$ of equal to or less than 2 mm in the protrusion direction (thickness direction) DS. The thickness n of the connection surface SSa in the protrusion direction (thickness direction) DS over the entire connection portion SS changes in a range of $0 \leq n \leq 2$ mm. If the relationship between the first reflective surface R1 and the second reflective surface R2 is expressed using the thickness n, even though there is a location where the thickness n, that is, the step between the first reflective surface R1 and the second reflective surface R2 partially becomes 0 mm, the thickness n does not become 0 mm over the entire surface of the first reflective surface R1 and the second reflective surface R2, there is necessarily a location where the first reflective surface R1 protrudes from the second reflective surface R2 (the thickness becomes n>0 mm), and the thickness of $n \geq 0$ mm is constantly maintained over the entire surface. That is, there is no case where the relationship between the first reflective surface R1 and the second reflective surface R2 is reversed and the thickness (step) becomes minus. In addition, the state of the thickness of $n \leq 2$ mm is constantly maintained over the entire surface, that is, there is no case where the step between the first reflective surface R1 and the second reflective surface R2 becomes excessively large. In the above-described case, a state where the first reflective surface R1 protrudes toward the observer side beyond the second reflective surface R2 in the connection portion SS is maintained and the connection portion SS does not become excessively large, whereby it is possible to prevent outside light from being unintentionally reflected in the connection portion SS. It is also possible to prevent the connection portion SS from being conspicuous.

Hereinafter, processing on outside light OL from the outside toward the connection surface SSa of the connection portion SS in the light guide member will be described referring to FIGS. 4A and 4B. FIG. 4A is a diagram illustrating an example of entrance of outside light OL into the connection portion SS in the light guide member 10, and in the drawing, the light guide direction of video light is indicated by an arrow AP. FIG. 4B is a diagram conceptually showing a state where a part of FIG. 4A is enlarged, and shows a state of a reflected component RL of outside light OL in the connection surface SSa (connection portion SS). As described above, in regard to ghost light, a component out of outside light OL reflected by the connection surface SSa and directed toward the optical path downstream side causes a problem. That is, in the drawing, the generation of a component along the arrow AP indicating the light guide direction causes a problem. For this reason, as shown in FIGS. 4A and 4B, of outside world light entering the connection surface SSa from the outside, outside light OL as a component being likely to cause a problem enters from the optical path upstream side toward the optical path downstream side. In regard to such a problem, in this embodiment, as described above, the inner surface of the connection surface SSa becomes a surface facing the optical path upstream side. Accordingly, as shown in the drawing, even if the connection surface SSa is exposed to outside light OL, and a part of outside light OL at this time is reflected to generate a reflected component RL, the reflected component RL is reflected as it is and is directed outward of the light guide member 10 or toward the optical path upstream side of video light GL, and can be made to be not or hardly directed toward the optical path downstream side. That is, it is possible to prevent light from being guided toward the optical path downstream side inside the light guide member 10 and being visually recognized by the observer to become ghost light, and to secure satisfactory image visibility. In contrast, for example, as in a comparative example shown in FIG. 4C, in a case where the direction of the connection surface SSa is reversed, that is, in a case where the relationship between the first reflective surface R1 and the second reflective surface R2 is reversed, as shown in the drawing, the reflected component RL of outside light OL may be directed toward the optical path downstream side of video light GL, and ghost light may be generated. In this embodiment, there is no location shown in FIG. 4C, whereby the generation of ghost light due to outside light is suppressed.

In this embodiment, the two reflective surfaces connected in the connection portion described above have the relationship of protrusion toward the observer side in the entire extended surfaces (surfaces having no optical functions) of the reflective surfaces. Specifically, returning to FIG. 3A, first, a surface constituted of the first reflective surface R1 (fourth surface S14) formed in an area portion ER1 having an optical function and an entire extended surface PF1 having no optical function of the first reflective surface R1 in an area outside the area portion ER1 is called a first surface SF1. Similarly, a surface constituted of the second reflective surface R2 (first surface S11) formed in an area portion ER2 having an optical function and an entire extended surface PF1 having no optical function of the second reflective surface R2 in an area outside the area portion ER2 is called a second surface SF2. In this case, the connection surface SSa of the connection portion SS continuously and smoothly connects the first surface SF1 and the second surface SF2, and the first surface SF1 protrudes toward the observer side beyond the second surface SF2 in the entire connected range. With this, the generation of ghost light due to outside light is suppressed even in a range exceeding the first reflective surface R1 and the second reflective surface R2 having optical functions.

Like the configuration shown in this application, in an optical system having a configuration in which an intermediate image is formed and light is guided using total reflection in the light guide member, hitherto, in order to achieve reduction in size of the apparatus and to maintain high accuracy, it is possible to perform optical path adjustment while suppressing aberration using a free-form surface in a light guide member or the like. For example, in JP-A-2015-72438, a free-form surface is provided in a part (a lens surface on a light emission side) of a projection lens in addition to a light guide member, thereby meeting a need for reduction in size while correcting aberration. However, for example, there is a limit to reduction in size in design due to restrictions that it is necessary to maintain total reflection conditions for light guide in the light guide member, or the like. Specifically, for example, in a case of reducing the distance between the intersection point C1 and the intersection point C2 in the light guide device 20 shown in FIG. 2, that is, reducing the length of the light guide device in the light guide direction, the total reflection conditions of video light are likely to cause a problem. In this case, as in this application, if the lens surface 33a is not constituted by a non-axisymmetric aspheric surface, there is a possibility that it particularly becomes difficult to perform control such that the partial light flux GLa which is a component emitted from the inside of the image display device near the human body satisfies the total reflection conditions on the respective surfaces S11, S13, and S14. For example, it is considered that the shape on a side of the surface S12 near the surface S13 through which a component of which total reflection conditions become severe passes is adjusted such that the partial light flux GLa satisfies the total reflection conditions. However, in a case of performing such adjustment, it is necessary to adjust not only the side near the surface S13 but also a portion of the surface S12 from a side near the surface S13 to the center side as an entire range of passing the partial light flux GLa as a whole. At this time, since a part (a portion of the surface S12 near the center) of the adjusted portion is within a range of passing the partial light flux GLb as a component emitted from the outside of the image display device 80 away from the human body, various restrictions are imposed on the shape adjustment of the surface S12, and aberration correction becomes difficult as the whole of the optical system. As other candidates for adjustment locations, for example, it is considered that the surface S14 which is a non-axisymmetric aspheric surface and reflects the partial light flux GLa and the partial light flux GLb in areas apart from each other is adjusted. However, the surface S14 is a location where not only reflection of video light GL but also transmission of video light GL is performed, and for example, the reflection area of the partial light flux GLa and the transmission area of the partial light flux GLb are superimposed. For this reason, various restrictions are imposed even in a case of adjusting the surface S14.

In contrast, in this embodiment, in particular, not only the lens surface 31a of the first lens 31 provided on the light emission side but also the lens surface 33a on the lens emission side of the third lens 33 provided on the light incidence side are non-axisymmetric aspheric surfaces. As described above, the lens surface 33a is a lens surface which is positioned on a side of the projection lens 30 comparatively near the image display device 80. For this reason, for example, as shown in the drawing, the partial light fluxes GLa and GLb emitted from two points P1 and P2 of different corner areas IA and OA on the inside and the outside out of an area (referred to as corner area) on the periphery side of the image surface OI pass through the lens surface 33a before intersecting each other. That is, in the above-described case, the lens surface 33a as a non-axisymmetric aspheric surface is provided at a position where the partial light fluxes GLa and GLb to reach the eye of the observer among the light fluxes of video light respectively emitted from the two points P1 and P2 of different corner areas in the image surface OI as a light emission surface of the image display device 80 do not intersect each other. The lens surface 33a at such a position is a non-axisymmetric aspheric surface (free-form surface), whereby the lens surface 33a exerts individual actions to the partial light flux GLa emitted from an area inside the image surface OI near the human body and the partial light flux GLb emitted from an area of the image surface OI away from the human body. That is, for example, it is possible to individually perform aberration correction to the partial light flux GLa and aberration correction to the partial light flux GLb. The stop ST provided in the inner surface of the projection lens 30 is deformed asymmetrically according to the difference between the emission situations of the respective partial light fluxes, such as the partial light fluxes GLa and GLb, whereby it is possible to shield components passing therethrough as appropriate.

As comparison, for example, in the lens surface 31a, the passage range of the partial light flux GLa and the passage range of the partial light flux GLb already overlap at this position, it is not possible to perform aberration correction on the partial light flux GLa and the partial light flux GLb separately and individually, and it is only possible to perform aberration correction as the whole of the light fluxes. In this embodiment, a non-axisymmetric aspheric surface (lens surface 33a) is provided at a position where components (partial light fluxes GLa and GLb) to reach the eye of the observer among the light fluxes of video light do not intersect each other, whereby it is possible to further reduce the size of the optical system while maintaining various kinds of optical accuracy, such as resolution or an angle of view, the same as the virtual image display apparatus disclosed in JP-A-2015-72438, and consequently, to reduce the size of the entire apparatus. Specifically, as described above, in the light guide device 20, for example, the distance (interval) between the intersection point C1 and the intersection point C2 can be set to be equal to or less than 48 mm.

In such an optical system in which reduction in size is achieved, since the light guide range is short, addressing a problem in that light enters during light guide and ghost light is generated may become particularly important. In this embodiment, as described above, the generation of ghost light can be addressed inside the light guide member 10. In addition to a case where the distance (interval) between the intersection point C1 and the intersection point C2 is set to be equal to or less than 48 mm, it is considered that the distance (interval) may be set to be, for example, equal to or less than 51 mm, and specifically, may be set to, for example, about 50.1 mm. In a case where the distance between the intersection point C1 and the intersection point C2 is set to be equal to or less than 51 mm, for example, it is possible to realize an HMD which is mountable in a state of wearing the glasses.

In this case, it is possible to reduce the total length of the projection lens 30 and reduce the lens thickness of each of the lenses 31 to 33 compared to the related art. With this, it is possible to realize further reduction in size and to realize a stylish appearance in design.

In this embodiment, as described above, the sight line axis SX is inclined at 6.7° with respect to the lens optical axis LX, and is inclined at about 10° from a vertical state to the light guide axis DX, thereby making the appearance shape more stylish.

In this embodiment, as described above, the configuration of the projection lens 30 is a complicated off-axis optical system, and a more crowded lens arrangement is made. Light emitted from the image display device 80 is adjusted corresponding thereto. That is, the emission angles of the respective partial light fluxes emitted from the image surface OI as the light emission surface of the image display device 80 are asymmetric with respect to the lens optical axis LX indicating the center of the image display device 80.

The above configuration will be described in the first and second direction DD1 and DD2. In regards to the respective partial light fluxes constituting video light GL, within a surface (xy plane) parallel within a surface of the image surface OI of the image display device 80, the emission angle of the light fluxes respectively emitted from the pixels arranged along the first direction DD1 as the x direction (horizontal direction) with respect to the second direction DD2 as the y direction (vertical direction) are different. In this embodiment, the curvature of the lens surface 33a of the projection lens 30 changes according to each passage position of the partial light flux emitted from the image display device 80. In addition, the curvature of the lens surface 33a changes corresponding to the incidence angle of the partial light fluxes (for example, the partial light flux GLa and the partial light flux GLb of FIG. 2) in the surface S12 of the light guide member 10.

In the configuration of this embodiment, for example, as will be apparent from the relationship between the partial light flux GLa and the partial light flux GLb described above, since symmetry as the whole of the emitted light fluxes collapses, it is not always possible to perform a desired function when narrowing light even if a stop having a usual symmetric shape and arrangement is provided, and there is a possibility that it is not possible to sufficiently eliminate ghost light or the like. In contrast, in this embodiment, the stop ST provided in the projection lens 30 has asymmetry corresponding to the components of video light GL, whereby it is possible to reliably eliminate excess light and to form an image with high performance.

Figure 6A:
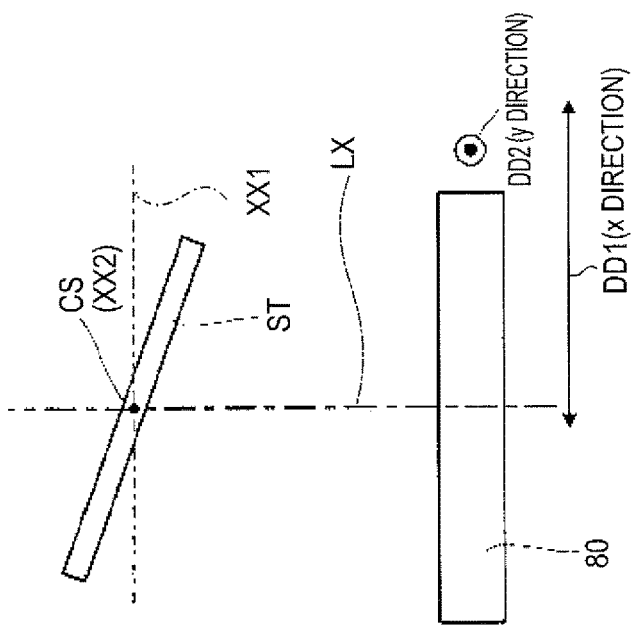
FIG. 6A is a diagram conceptually showing an example of the arrangement relationship between a video element and a stop of the projection optical system.
Figure 6B:
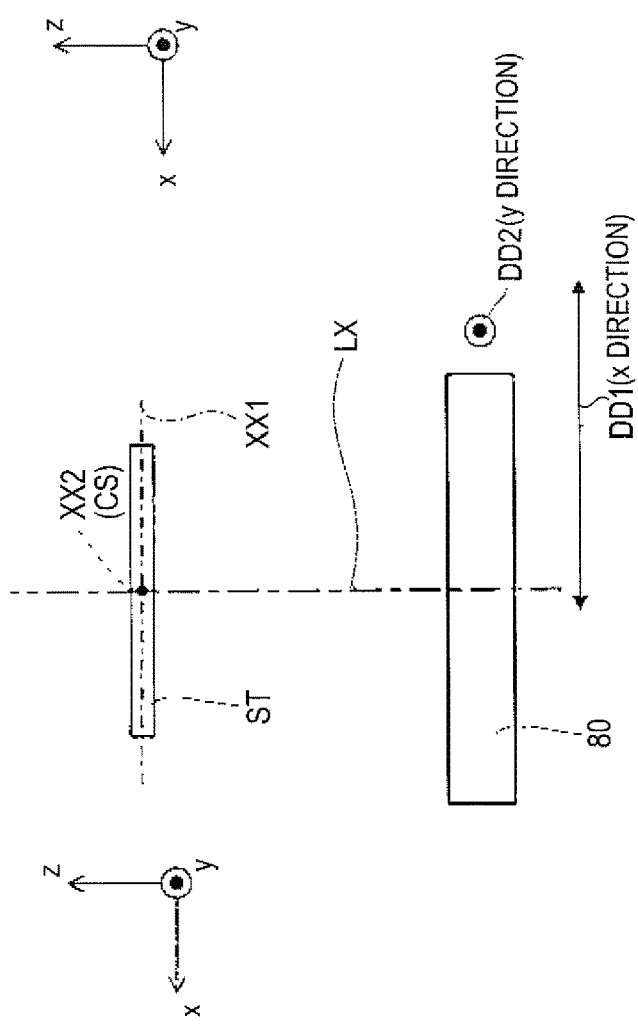
FIG. 6B is a diagram conceptually showing a modification example of the arrangement relationship between the video element and the stop of the projection optical system.

Hereinafter, the structure of the stop ST provided in the projection lens 30 will be described referring to FIGS. 5A and 5B, 6A and 6B, and the like. FIG. 5A is a sectional view showing the configuration of an example of the projection lens 30, and FIG. 5B is a front view of a lens barrel 39 constituting the projection lens 30. FIG. 6A is a diagram conceptually showing the arrangement relationship between the image display device 80 and the stop ST of the projection lens 30 in an example shown in FIGS. 5A and 5B. FIG. 6B is a diagram conceptually showing a modification example of the arrangement relationship between the image display device 80 and the stop ST of the projection lens 30.

Hereinafter, first, an example shown in FIGS. 5A, 5B, and 6A will be described. As shown in the drawings, the stop ST is provided as a part of the inner surface of the lens barrel 39. As shown in FIG. 5A, the stop ST has a frame-shaped structure which is provided vertically to the lens optical axis LX between the second lens 32 and the third lens 33, and in particular, as shown in FIG. 5B, the stop ST has a trapezoidal shape in front view. With this, it is possible to cut unnecessary light corresponding to the respective partial light fluxes emitted from the image surface OI in the above-described asymmetric state as appropriate, and to prevent the generation of excess light (ghost light) inside and outside video.

Hereinafter, the shape or structure of the stop ST will be described in detail. First, as shown in FIGS. 5A and 5B, as described above, the x direction is called the first direction DD1, and the y direction is called the second direction DD2. In other words, a direction (in FIG. 2, an extension direction within a XZ plane the same as the light guide direction) which is vertical to the normal direction (the Z direction in which the lens optical axis LX of FIG. 2 extends) of the image surface OI and corresponds to the light guide direction (the extension direction of the light guide axis DX of FIG. 2) of the light guide member 10 is called the first direction DD1, and a direction vertical to the normal direction of the image surface OI and the first direction DD1 is called the second direction DD2. As shown in FIGS. 5B and 6A, in the stop ST, an axis which intersects the lens optical axis LX passing through the center of the image surface OI and is parallel to the first direction DD1 is called a first axis XX1, and an axis which intersects the lens optical axis LX and is parallel to the second direction DD2 is called a second axis XX2. As shown in FIG. 6A and the like, a point where the first axis XX1, the second axis XX2, and the lens optical axis LX intersect is called an intersection point CS. The intersection point CS indicates the center of the stop ST. In the above-described case, a quadrangular opening OP formed by the stop ST is shaped to be line-symmetric to the first axis XX1 and non-line-symmetric to the second axis XX2 corresponding to asymmetry to the first direction DD1 and symmetry to the second direction DD2 of the respective partial light fluxes constituting video light GL.

Next, a modification example shown in FIG. 6B will be described. As described above, FIG. 6B is a diagram conceptually showing the arrangement relationship between the image display device 80 and the stop ST of the projection lens 30, and is a diagram corresponding to FIG. 6A. In FIG. 6B, for ease of comparison with FIG. 6A, the first axis XX1 and the like specified in FIG. 6A are described likewise. In the above-described example, although the stop which is provided vertically to the normal direction (the Z direction in which the lens optical axis LX of FIG. 2 extends) of the image surface OI is shown as an example, as shown in FIG. 6B, the stop ST of this modification example is provided with the square opening OP which is provided diagonally with respect to the projection optical system optical axis. That is, as will be understood in comparison with FIG. 6A, the stop ST shown in FIG. 6B is rotated around the y axis from the vertical arrangement state illustrated in FIG. 6A and provided to be inclined. In this way, the stop ST is provided to be inclined with respect to the lens optical axis LX, that is, non-vertically, whereby the opening can be regarded as having a trapezoidal shape in front view even if the opening has, for example, a square shape (rectangular shape), not a trapezoidal shape. The degree of inclination of the stop ST with respect to the lens optical axis LX corresponds to change in emission angle, whereby it is possible to more strictly eliminate unnecessary light. If another way of thinking is taken, in this case, light is shielded spatially (three-dimensional) in consideration of a depth direction along the lens optical axis LX. In this case, in addition to a case where the stop ST is formed along a non-vertical plane, the stop ST may be formed along a curved surface (non-plane).

Hereinafter, emission of light from the image display device 80 will be described from another viewpoint. Light emitted from the image display device 80 has angle-brightness characteristics, and the angle-brightness characteristics significantly depend on the pixel opening shape. In general, the larger the opening shape, the larger the half angle at maximum of the angle-brightness characteristics. That is, light is emitted with high brightness even in a larger angle direction with respect to the normal to the panel, the smaller the opening shape, the smaller the half angle at maximum, and a peaked shape is obtained. In particular, in a micro display device which is used in an HMD, such as the virtual image display apparatus 100 of this embodiment, the opening shape of one pixel falls below 10 μm, and in this case, for example, brightness in a direction inclined at about 20° with respect to the normal direction of the image surface OI is cut by 50% with respect to the normal direction. With this, brightness unevenness of video may occur. In particular, as in this embodiment, in a case of an optical system in which the state of the light flux is different according to the panel position, brightness unevenness may cause a large problem. Accordingly, in this embodiment, a pixel layout is adjusted such that, the larger the emission angle, the larger the opening of the pixel, thereby suppressing the occurrence of brightness unevenness. In this embodiment, for example, a structure in which the opening is wider in the second direction DD2 than in the first direction DD1 may be made such that the emission angle in the second direction DD2 (y direction) can be adjusted to be different according to the position in the first direction DD1 (x direction), and the size of each opening pixel may change according to each position of the first direction DD1. The brightness at an angle inclined with respect to the normal direction of the panel may become a maximum according to a substrate structure of the panel. That is, a ray direction with maximum brightness among the light fluxes emitted from the image display device 80 may be different according to the position of the pixel of the image display device 80.

Figure 7A:
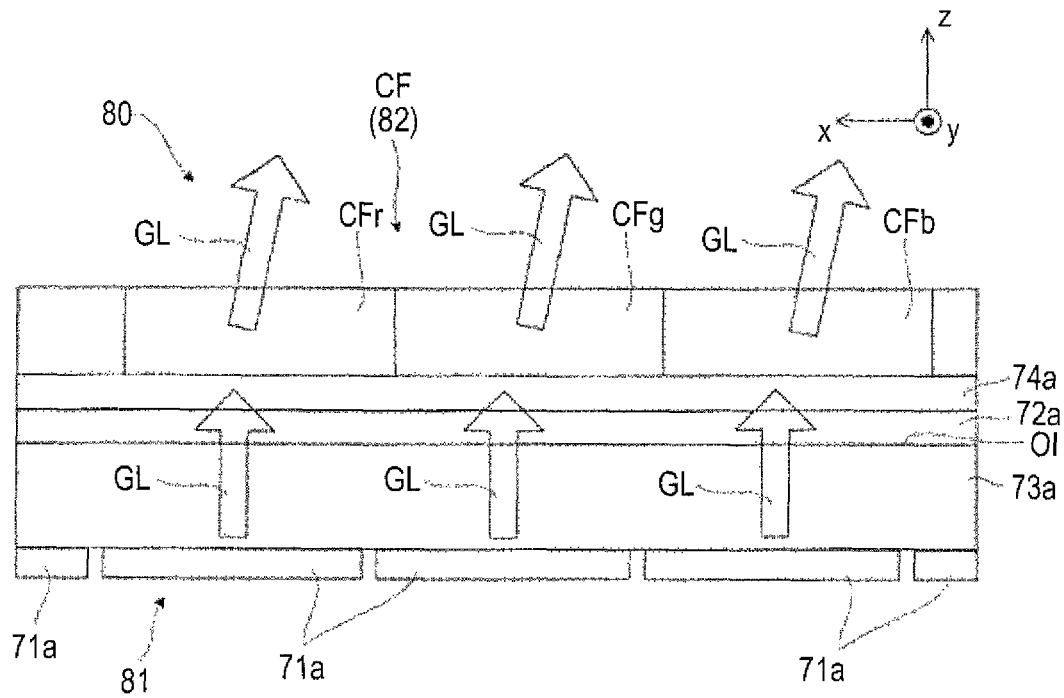
FIG. 7A is a conceptual diagram showing a state on a periphery side of the apparatus in a configuration example of an image display device.
Figure 7B:
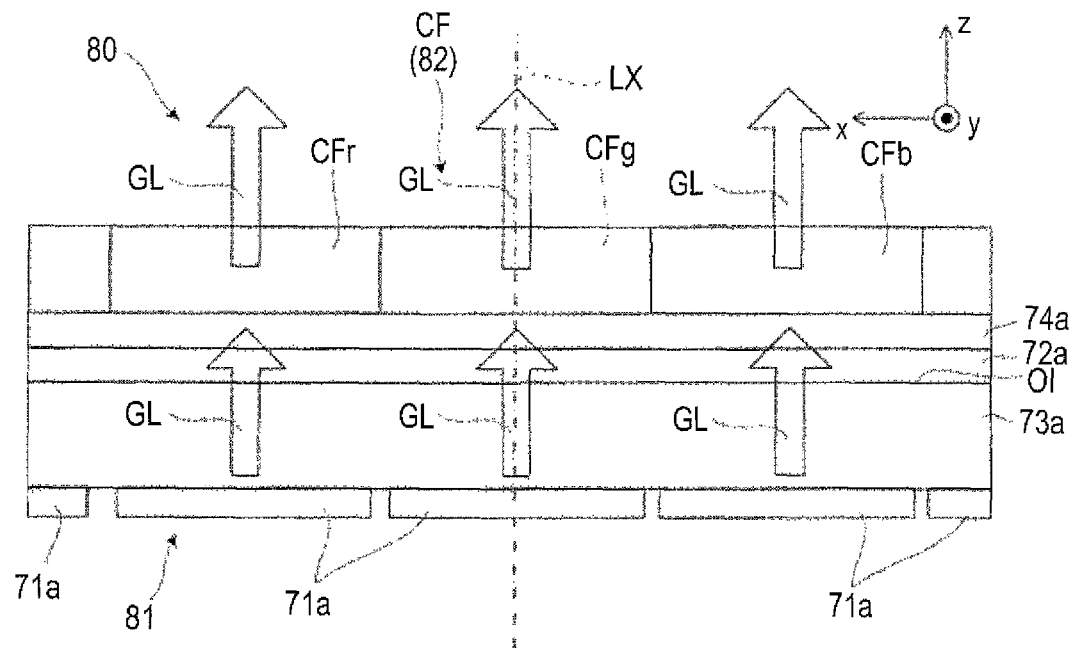
FIG. 7B is a conceptual diagram showing a state on a center side of the apparatus.

Hereinafter, a more specific example of the optical configuration of the image display device 80 in the virtual image display apparatus 100 will be described in detail referring to FIGS. 7A and 7B.

First, as described above, the image display device 80 is a self-luminous image display device having the drive control unit (not shown) which controls the operation of the image generation unit 81, in addition to the image generation unit 81 or the color filter layer CF as the intensity distribution control unit 82 provided at the immediate downstream of the image generation unit 81. A configuration example of the image display device 80 will be described more specifically referring to FIGS. 7A and 7B. Of the image display device 80, the image generation unit 81 includes a plurality of transparent electrodes (anode) 71a as pixel electrodes, a counter electrode (cathode) 72a, an organic EL layer 73a as a light emission function layer (light emission layer) provided between the transparent electrodes 71a and the counter electrode 72a, and a protective layer 74a. The color filter layer CF as the intensity distribution control unit 82 is formed on the protective layer 74a. The color filter layer CF is constituted of color filter parts CFr, CFg, and CFb for red, green, and blue, and the respective color filter parts CFr, CFg, and CFb are arranged in a matrix corresponding to a plurality of transparent electrodes (anode) 71a as pixel electrodes. With the configuration described above, the image display device 80 suitably operates the electrodes 71a and 72a to allow the organic EL layer 73a to emit light, whereby the image generation unit 81 emits video light GL from the image surface OI. That is, the image display device 80 includes the organic EL as a light source, and emits video light GL to each pixel constituting the image surface OI. Light emitted by the image generation unit 81 as video light GL passes through the color filter layer CF, and color video light (image light) GL is emitted from the image display device 80. In this embodiment, in the color filter layer CF as the intensity distribution control unit 82, the color filter parts CFr, CFg, and CFb for the respective colors are arranged with a pitch different from the pitch of the pixels in a matrix constituting the image surface OI, that is, the pitch of a plurality of transparent electrodes 71a, 71a, and 71a arranged in a matrix. With this, as shown in FIG. 7A, on the periphery side apart from the lens optical axis LX as the center optical axis of the image display device 80, the positions of the color filter parts CFr, CFg, and CFb for the respective colors are shifted with respect to the corresponding electrodes 71a, 71a, and 71a (in the case of the drawing, the positions of the color filter parts CFr, CFg, and CFb for the respective colors are shifted to the right, or the positions of the outer edges are shifted), whereby the intensity distribution state of component light emitted through the color filter layer CF is inclined diagonally (in the case of the drawing, diagonally right), and component light is emitted to be closer to the lens optical axis LX side. As shown in FIG. 7B, around the lens optical axis LX of the image display device 80, that is, on the center side, the shift described above is not generated or slight if generated, whereby the intensity distribution state of emitted component light is not inclined, and component light is emitted vertically or nearly vertically. The degree of inclination of emitted light is adjusted for each position or in units of area to a certain extent, whereby it is possible to constitute a desired emission state (asymmetric state).

In summary, in the image display device 80, the image generation unit 81 is a pixel matrix for forming the image surface OI by arranging the pixels in a matrix using a plurality of transparent electrodes 71a as pixel electrodes, and the color filter layer CF as the intensity distribution control unit 82 has shapes different for each position of the image surface OI such that shift with respect to the pitch of the pixels in a matrix (the pitch of the transparent electrodes 71a) constituting the image surface OI is larger from the center side toward the periphery side. With this, control is performed such that the intensity distribution state of light is suitable for each position of the image surface OI. That is, light at an angle to be a principal ray of light emitted at each position is the strongest, and as a result, the color filter layer CF as the intensity distribution control unit 82 performs control such that light is emitted in the strongest intensity distribution with respect to the axial direction of the principal ray of a component emitted from each position of the image surface OI. As described above, in this embodiment, the color filter layer CF functions as the intensity distribution control unit 82 which controls the intensity distribution of video light GL as emission light.

As described above, in the virtual image display apparatus 100 of this embodiment, in the connection portion SS connecting the first reflective surface R1 and the second reflective surface R2, the first reflective surface R1 provided relatively on the incidence side of video light GL protrudes toward the observer side beyond the second reflective surface R2 provided relatively on the emission side of video light, and the connection surface SSa as the surface of the connection portion SS is shaped to extend from a side close to the observer toward a side away from the observer between the first reflective surface R1 and the second reflective surface R2. With this, even if a part of outside light OL is reflected, the reflected component RL is not or hardly directed toward the optical path downstream side and the generation of ghost is suppressed. In addition, in the virtual image display apparatus 100 of this embodiment, in the projection lens 30, the lens surface 33a at a position where the components to reach the eye of the observer among the light fluxes of video light respectively emitted from the two points P1 and P2 of the different corner areas IA and OA in the image surface OI as the light emission surface of the image display device 80 do not intersect each other is formed with a non-axisymmetric aspheric surface, whereby it is possible to further reduce the size of the optical system while maintaining various kinds of optical accuracy, such as resolution or an angle of view, and consequently, to reduce the size of the entire apparatus. At this time, in particular, the stop ST which forms the quadrangular opening OP having non-line-symmetry is provided, whereby it is possible to adjust light in the stop ST as appropriate even if each light flux from each point of the image display device 80 is emitted at a different angle with respect to the second direction DD2 as described above, and to provide high image quality video.

Second Embodiment

Figure 8:
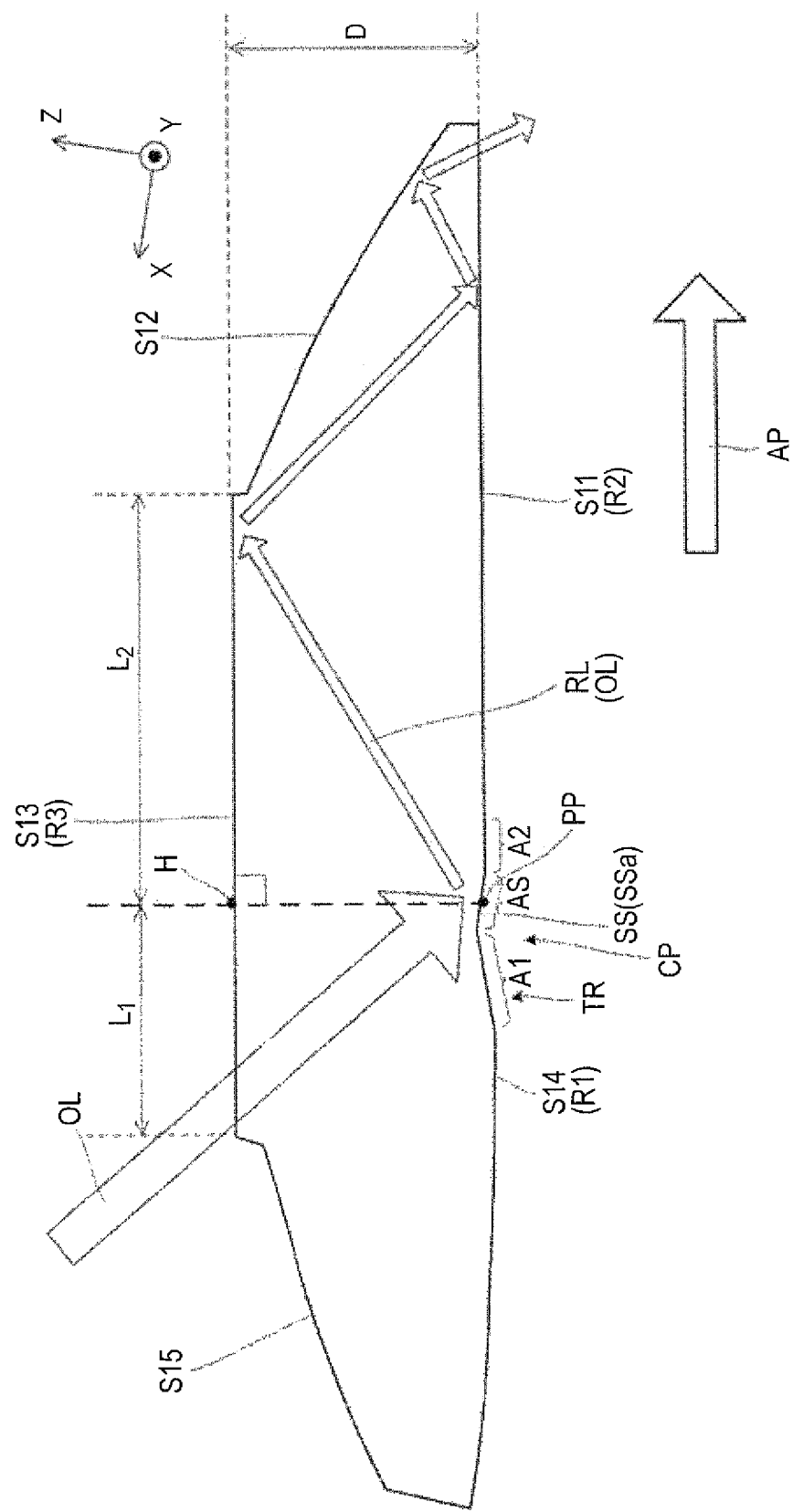
FIG. 8 is a diagram illustrating a light guide member constituting a virtual image display apparatus according to a second embodiment.

Hereinafter, a virtual image display apparatus according to a second embodiment will be described referring to FIG. 8 and the like. The virtual image display apparatus according to the second embodiment has a configuration in which a part of the light guide member in the virtual image display apparatus of the first embodiment is changed, and FIG. 8 is a diagram corresponding to FIG. 4A and is a diagram showing an example of a light guide member which is incorporated in the virtual image display apparatus according to this embodiment. Portions which are not particularly described are the same as those in the first embodiment, and thus, the illustration or description of the entire virtual image display apparatus will not be repeated.

In this embodiment, as in the first embodiment, as shown in FIG. 8, in a light guide member 10, a plurality of reflective surfaces are constituted of surfaces S11 to S15, and the fourth surface S14 and the first surface S11 are provided as a pair of reflective surfaces provided adjacent to each other on the observer side. That is, light guide of video light in the light guide member 10 is common with the configuration of the first embodiment. As in the first embodiment, the fourth surface S14 provided relatively on the incidence side of video light GL is a first reflective surface R1, and the first surface S11 provided relatively on the emission side of video light is a second reflective surface R2. A portion connecting the first reflective surface R1 and the second reflective surface R2 is a connection portion SS, and in particular, the surface of the connection portion SS, that is, an inclined surface continuously and smoothly connecting between the first reflective surface R1 and the second reflective surface R2 is a connection surface (inclined connection surface) SSa. In this case, the first reflective surface R1 on the incidence side is formed with a free-form surface (fourth surface S14), and the second reflective surface R2 on the emission side is formed with a flat surface (first surface S11). The third surface S13 which is a surface facing the first reflective surface R1 (fourth surface S14) and the second reflective surface R2 (first surface S11) among the surfaces S11 to S15 constituting a plurality of reflective surfaces of the light guide member 10 is a third reflective surface R3. The third reflective surface R3 is formed with a flat surface parallel to the second reflective surface R2.

In this embodiment, for example, as shown in FIG. 8, the first reflective surface R1 has a recess portion TR more recessed than the second reflective surface R2, and the light guide member 10 has a recess CP as a location where the recess portion TR is formed in the connection portion SS and the vicinity thereof. From this, the light guide member 10 of this embodiment is different from that in the first embodiment. That is, in the first embodiment, in the connection portion SS of the light guide member 10 and the periphery thereof, the first reflective surface R1 constantly protrudes toward the observers side compared to the second reflective surface R2, and there is no portion where the second reflective surface R2 protrudes toward the observer side from the first reflective surface R1. In contrast, in this embodiment, there is a portion where the first reflective surface R1 protrudes toward the observer side from the second reflective surface R2. In other words, the second embodiment is different from the first embodiment in that there is the state shown in FIG. 4C. In this embodiment, the connection portion SS is formed such that the inclination angle θ of the connection surface (inclined connection surface) SSa with respect to the second reflective surface R2 is maintained to be equal to or less than a predetermined value according to the recess portion TR of the first reflective surface R1, that is, the degree of recess in the recess CP, thereby achieving suppression of ghost light. In the recess CP, as shown in the drawing, a surface portion is constituted of an area A1 of the recess portion TR (the end portion on the connection portion SS side) of the first reflective surface R1, an area AS of the connection surface SSa of the connection portion SS, and an area A2 of the end portion of the second reflective surface R2 on the connection portion SS side.

As described in the first embodiment, in order to suppress the generation of ghost light, in the processing of outside light OL, it is desirable to avoid a component reflected by the connection portion SS (connection surface SSa) from being directed toward the optical path downstream side as much as possible, and to this end, it is preferable that there is no portion where the second reflective surface R2 protrudes toward the observer side from the first reflective surface R1, and the connection surface SSa smoothly connecting these surfaces in the connection portion SS is not directed toward the optical path downstream side. However, for example, due to demand for reduction in size of the apparatus, maintenance of an angle of view and resolution, and the like, in optical design of the respective reflective surfaces, the relationship between the first reflective surface R1 and the second reflective surface R2 is not necessarily able to be maintained in the state shown in the first embodiment, and a case may occur where there is a portion where the first reflective surface R1 protrudes toward the observer side from the second reflective surface R2.

In this embodiment, even in a case where such a case is assumed, that is, a component reflected by the connection portion SS (connection surface SSa) is directed toward the optical path downstream side, a configuration is made in which the generation of ghost light due to this component is suppressed.

Hereinafter, in particular, the first reflective surface R1, the second reflective surface R2, the connection portion SS, and the like of the light guide member 10 constituting the virtual image display apparatus according to this embodiment will be described in detail referring to FIGS. 8 and 9. First, as shown in FIG. 8, in this embodiment, in regard to the length in the light guide direction (a direction of an arrow AP) in the third reflective surface R3 of the light guide member 10, the length on the incidence side of video light from the center PP of the connection portion SS is represented as a length $L_1$, and the length on the emission side is represented as a length $L_2$. That is, as shown in the drawing, a vertical line segment from the center PP to the third reflective surface R3 has an intersection point H. In this case, the length on the incidence side of video light from the intersection point H in the light guide direction (the direction of the arrow AP) is represented as the length $L_1$, and the length on the emission side is represented as the length $L_2$. From the viewpoint of see-through vision, the length of the third reflective surface R3, that is, it is preferable that the total length of the length $L_1$ and the length $L_2$ is as long as possible. For example, if almost the same length as that of the light guide member of an example shown in the first embodiment is provided, it is desirable that $L_1$=about 14 mm and $L_2$=about 19.5 mm. The thickness D (that is, the distance between the second reflective surface R2 and the third reflective surface R3) of the light guide member 10 is considered to be, for example, D=about 10 mm is considered from the viewpoint of securing the angle of view of video light.

In the configuration described above, a component which is most likely to cause a problem as outside light OL is the reflected component RL which enters diagonally from a portion of the third reflective surface R3 (third surface S13) on the incidence side of video light (enters at a large incidence angle with respect to the third reflective surface R3) and is reflected by the connection surface SSa of the connection portion SS. If this reflected component RL propagates at an angle to be directed directly toward the second surface S12 after reflected by the connection surface SSa, there is a possibility that the reflected component RL becomes ghost light which reaches the eye of the observer after reflected by the second surface S12. In contrast, as shown in FIG. 8, if the reflected component RL reflected by the connection surface SSa does not directly reach the second surface S12 and is reflected at an angle to be directed toward the third reflective surface R3 (third surface S13), as a result, the reflected component RL does not reach the eye of the observer. Specifically, as shown in FIG. 8, the reflected component RL is directed toward the third surface S13 (third reflective surface R3) in front of the second surface S12. When this happens, it is considered that the optical path of the reflected component RL departs from the optical path of video light and is not visually recognized as ghost light. Accordingly, in this embodiment, the angle or shape of the connection surface SSa is adjusted with respect to the incidence angle of outside light OL in consideration of the above matters, thereby suppressing the generation of ghost light. As shown in FIG. 9, the incidence angle of outside light OL with respect to the third reflective surface R3 is represented as an incidence angle $\alpha_0$, and an angle of refraction after incidence is represented as $\alpha_1$. In addition, an angle between the reflected component RL after reflected by the connection surface SSa and the vertical line of the second reflective surface R2 (or the third reflective surface R3) is represented as an angle $\alpha_2$. For simplification of description, the connection surface SSa is regarded as having a constant or nearly constant inclination. That is, a maximum value of the inclination angle $\theta$ of the connection surface SSa with respect to the second reflective surface R2 is called a maximum inclination angle $\theta$.

Hereinafter, the relationship between the respective numerical values described above will be described referring to relational expressions. First, the relationship between the incidence angle $\alpha_0$ and the angle of refraction $\alpha_1$ of outside light OL as incident light in the third reflective surface R3 is expressed using a refractive index $n_1$ (a relative refractive index with respect to air) of the light guide member 10 by the Snell's law.

$$n_1 \sin \alpha_1 = \sin \alpha_0 \quad (1)$$

The condition that outside light OL enters from the third reflective surface R3 (in particular, enters from a diagonal direction close to the light guide direction) is $\alpha_0 < 90°$ (that is, $\sin \alpha_0 < 1$), Expression (1) becomes as follows.

$$\alpha_1 = \sin^{-1} \frac{1}{n_1} \quad (2)$$

Next, the angle of refraction $\alpha_1$, the inclination angle (maximum inclination angle) $\theta$, and the angle $\alpha_2$ have the following relationship from the reflection conditions in the inclined connection surface SSa.

$$\alpha_2 - \theta = \alpha_1 + \theta$$

That is, the following expression is established.

$$\alpha_2 = \alpha_1 + 2\theta \quad (3)$$

In order to prevent outside light OL from being visually recognized as ghost light, as described above, the angle $\alpha_2$ which is the propagation angle of the reflected component RL after reflected by the inclined connection surface SSa may have a sufficiently small value. From the condition shown in the drawing, it is considered that the angle $\alpha_2$ may have a sufficient small value in the relationship with the ratio of the length $L_2$ to the thickness D. That is, the following expression is established.

$$\tan \alpha_2 < \frac{L_2}{D} \quad (4)$$

If this expression is established, it is considered that the reflected component RL reaches the third surface S13 (third reflective surface R3) in front of the second surface S12. If (4) is modified by substituting Expression (3) therein, the following expression is established.

$$\theta < \frac{1}{2}\left(\tan^{-1}\left(\frac{L_2}{D}\right) - \alpha_1\right) \quad (5)$$

In Expression (5), the value of the angle of refraction $\alpha_1$ can be calculated from the refractive index $n_1$ of the light guide member 10 as shown in Expression (2).

The inclination angle (maximum inclination angle) θ of the inclined connection surface SSa with respect to the second reflective surface R2 satisfies Expression (5) described above, whereby, even if the shape of the light guide member 10 is considered, and accordingly, the component reflected by the inclined connection surface SSa is directed toward the optical path downstream side, the generation of ghost light due to this component is suppressed.

It is assumed that the light guide member 10 according to this embodiment has the same structure and shape (size) as those in the first embodiment as an example, and in the overall configuration other than local parts, such as the connection portion SS, as specific numerical values of the above-described lengths, angles, and the like, $n_1=1.52$, L1=14 mm, L2=19.5 mm, and D=10 mm are set. In a case where these values are taken, the inclination angle (maximum inclination angle) θ may satisfy Expression (6) described below from Expression (5) described above.

$$\theta < 10.9 \text{ deg} \quad (6)$$

That is, in the case of the above-described configuration example, if the maximum inclination angle θ is less than 10.9°, a configuration is made in which the above-described requirements are satisfied and a sufficient effect of suppressing ghost light is expected.

Hereinafter, the inclination angle θ, that is, the shape or structure of the connection portion SS (or the inclined connection surface SSa) will be further examined.

As shown in FIG. 9 on a partially enlarged scale, in the connection portion SS, the width of the light guide member 10 in the light guide direction (the direction of the arrow AP) is represented as a width W, and the step (the maximum difference in the protrusion direction) between the first reflective surface R1 and the second reflective surface R2 is represented as a maximum difference G, the following expression can be approximated.

$$G \approx W \tan \theta \quad (7)$$

Though also depending on optical design of the light guide member 10, it is assumed that the maximum difference G is, for example, about 0.2 mm. A case where the width W is set to be equal to or greater than 1.7 mm is considered. In the above-described case, from Expression (7) described above, the inclination angle (maximum inclination angle) θ of the inclined connection surface SSa can be set to about 6.9°. For example, if the inclination angle (maximum inclination angle) θ is set to be equal to or less than 6.9°, from Expression (6) described above, even if the component reflected by the inclined connection surface SSa is directed toward the optical path downstream side, it is considered that it is possible to sufficiently suppress the generation of ghost light due to this component.

In the above description, although the inclination angle θ is the maximum inclination angle θ, a case where the inclination angle in the inclined connection surface SSa is different according to the position can also be examined similarly. That is, in the entire area of the inclined connection surface SSa, the inclination angle is equal to or less than a predetermined value, whereby it is possible to maintain the relationship described above.

Figure 10A:
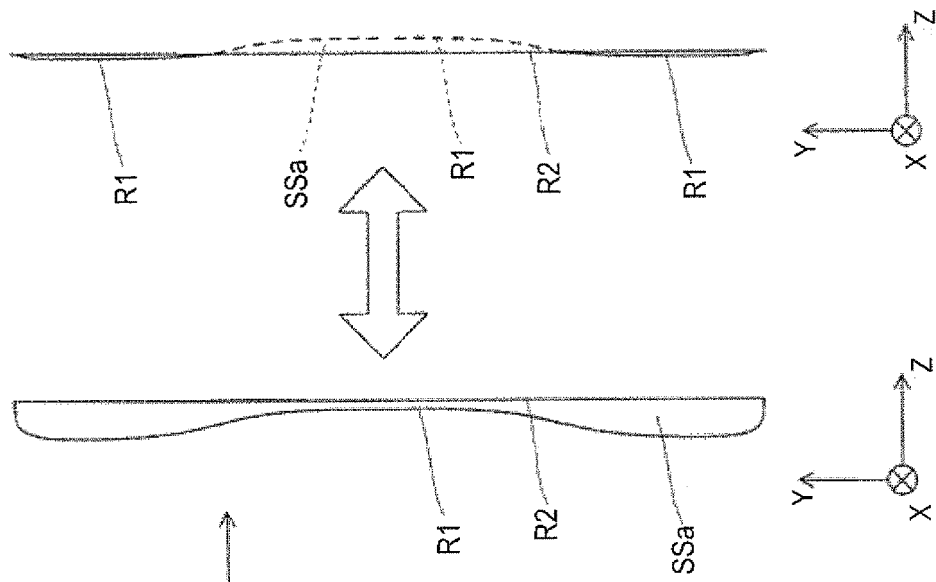
FIG. 10A is a diagram showing FIG. 3C again for comparison with the first embodiment.
Figure 10B:
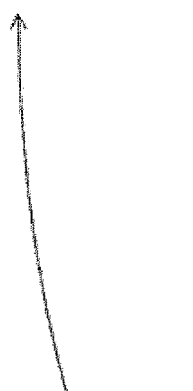
FIG. 10B is a conceptual diagram in which a part of FIG. 10A is taken out.
Figure 10C:
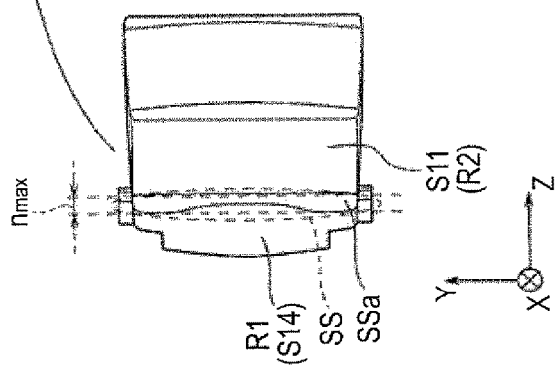
FIG. 10C is a diagram corresponding to FIG. 10B and is a conceptual diagram in which a part of the light guide member of the virtual image display apparatus in this embodiment is taken out.

Hereinafter, the shape and configuration of the connection portion SS in a longitudinal direction (y direction) will be described referring to FIGS. 10A to 10C while comparing with the difference from the case in the first embodiment. FIG. 10A shows FIG. 3C again for comparison with the first embodiment. FIG. 10B is a conceptual diagram in which a portion relating to the connection portion SS is taken out as a part of FIG. 10A. FIG. 10C is a diagram corresponding to FIG. 10B, and a conceptual diagram in which a portion relating to the connection portion SS in this embodiment is taken out. As will be apparent from comparison of FIG. 10B and FIG. 10C, the first embodiment and this embodiment are different in the maximum thickness n in the protrusion direction (thickness direction). Specifically, in the first embodiment, as shown in FIG. 10B and as described above, in the connection portion SS, the thickness n of the connection surface SSa in the protrusion direction (thickness direction) DS changes in a range of 0≤n≤2 mm. That is, the maximum thickness $n_{max}$ of the connection surface SSa in the protrusion direction (thickness direction) is equal to or less than 2 mm, and there is no case where the thickness n over the entire connection portion SS have has a negative value (the positional relationship between the first reflective surface R1 and the second reflective surface R2 is reversed). In contrast, in this embodiment, as shown in FIG. 10C, the thickness n of the first reflective surface R1 in the protrusion direction with respect to the second reflective surface R2 is in a range of −0.2≤n≤2 mm over the entire connection portion SS. That is, there is a location where the positional relationship between the first reflective surface R1 and the second reflective surface R2 is reversed, and n may have a negative value. In other words, the first reflective surface R1 may be shaped to be recessed with respect to the second reflective surface R2. A location under such a condition forms the recess CP shown in FIG. 8, 9, or the like. A case where n becomes a minimum value of a negative value corresponds to a case where the above-described maximum difference G becomes 0.2 mm. The thickness n is in a range of −0.2≤n≤2 mm, whereby it is possible to suppress a situation in which the difference in position between the first reflective surface R1 and the second reflective surface R2 becomes excessively large, that is, the connection portion SS becomes excessively large and outside light is unintentionally reflected in the connection portion SS. It is also possible to prevent the connection portion SS from conspicuous.

Figure 11:
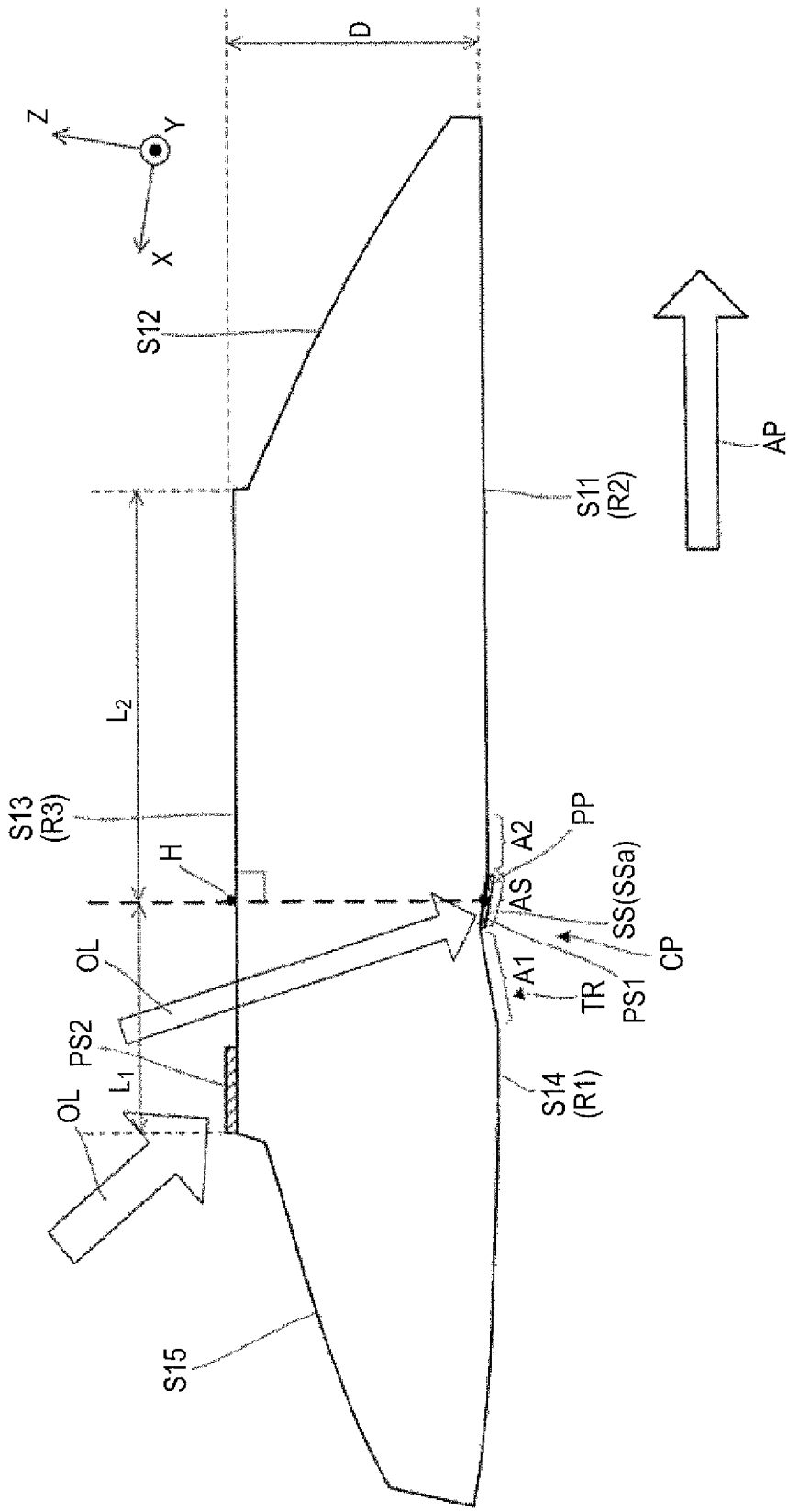
FIG. 11 is a diagram illustrating a modification example of the light guide member constituting the virtual image display apparatus according to the second embodiment.

Hereinafter, a modification example of the light guide member constituting the virtual image display apparatus according to this embodiment will be described referring to FIG. 11. In the modification example shown in FIG. 11, the connection portion SS has a processed surface portion PS1 which is sand-polished or blackened. Of the third reflective surface R3 as a reflective surface facing the first reflective surface R1 and the second reflective surface R2, in particular, on the incidence side of video light from the connection portion where a problem of outside light OL is likely to occur, a processed surface portion PS2 which is sand-polished or blackened is provided. The processed surface portions PS1 and PS2 which are sand-polished or blackened are provided in the locations described above, whereby it is possible to absorb and diffuse outside light OL to suppress the generation of ghost light due to outside light OL. It should be noted that only one of the processed surface portions PS1 and PS2 may be provided, and as shown in the drawing, both of the processed surface portions PS1 and PS2 may be provided.

As described above, in the virtual image display apparatus according to this embodiment, in the connection portion SS connecting the first reflective surface R1 and the second reflective surface R2, the inclination angle θ of the connection surface SSa as a front surface with respect to the second reflective surface R2 is adjusted, whereby, even in a case where the reflected component RL of a part of outside light OL is directed toward the optical path downstream side, the generation of ghost light due to this component is suppressed.

In addition, for example, in order to suppress the generation of ghost light due to stray light from the light source side, blackening processing may be carried out at each location as necessary. For example, a case where an edge portion of the lens is subjected to blackening processing to cope with ghost light or the like due to video light.

In the above description, although the second reflective surface R2 and the third reflective surface R3 are formed with planes parallel to each other, the invention can be applied to a case where the second reflective surface R2 and the third reflective surface R3 are formed of parallel curved surfaces.

In the above description, although the recess portion TR where the first reflective surface R1 is more recessed than the second reflective surface R2 is formed in a part of the first reflective surface R1 (see FIG. 10C), a case where the recess portion TR is formed over the entire portion is also considered.

Others

Although the invention has been described above based on the respective embodiments, the invention is not limited to the foregoing embodiments, and can be carried out in various aspects without departing from the spirit and scope of the invention. For example, in the above description, although the non-axisymmetric aspheric surface (lens surface 33a) is provided at the position where the components to reach the eye of the observer among the light fluxes of video light respectively emitted from the two points P1 and P2 of the different corner areas IA and OA in the image surface OI as the light emission surface of the image display device 80 do not intersect each other, such a surface shape may not be provided.

In the above description, although the image generation unit 81 including an organic EL (OLED) is used as the image display device (video element) 80, the invention is not limited thereto, various image display devices, such as an image display device including a transmissive liquid crystal display device and a backlight, are available as the image display device 80.

For example, a configuration using a reflective liquid crystal device may be made, and a digital micromirror device or the like may be used instead of the image generation unit 81 made of a liquid crystal display device or the like. An LED array or the like may be used as a self-luminous element.

In the foregoing embodiments, although the panel type image display device 80 including an organic EL (OLED) is used, alternatively, a scanning type image display device may be used. Specifically, for example, a light diffusion element is provided in the image surface OI, light is scanned at the position of the image surface OI by a scanning illumination optical system to form an image, and video light is emitted by a diffusion action of the light diffusion element, whereby it is possible to apply the same configuration as described above.

Figure 12A:
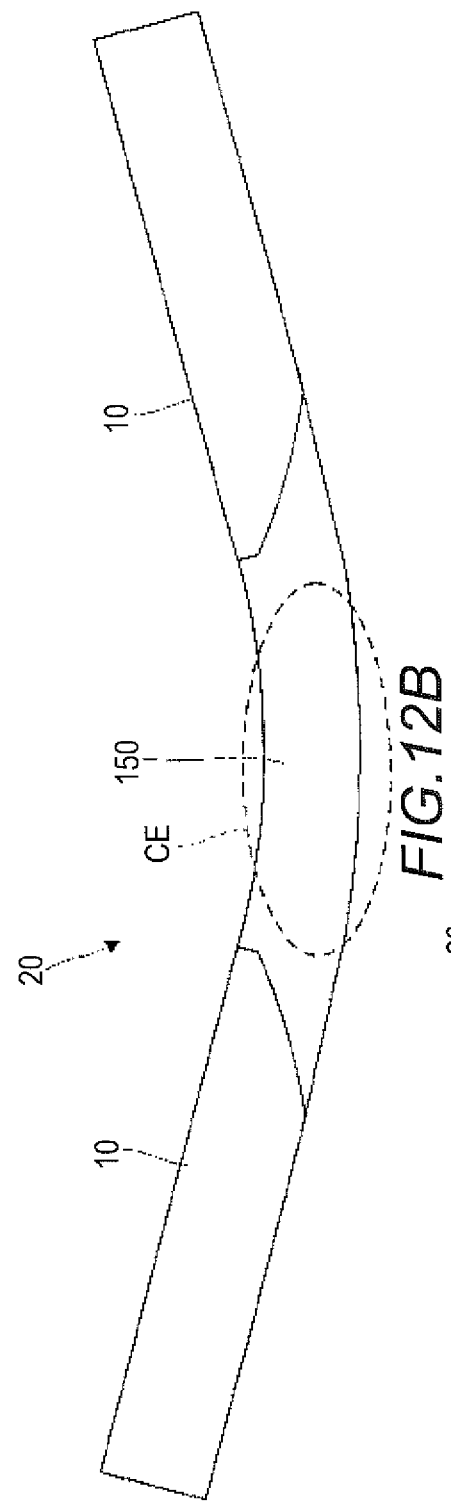
FIG. 12A is a plan view conceptually showing a modification example of a light guide device.
Figure 12B:
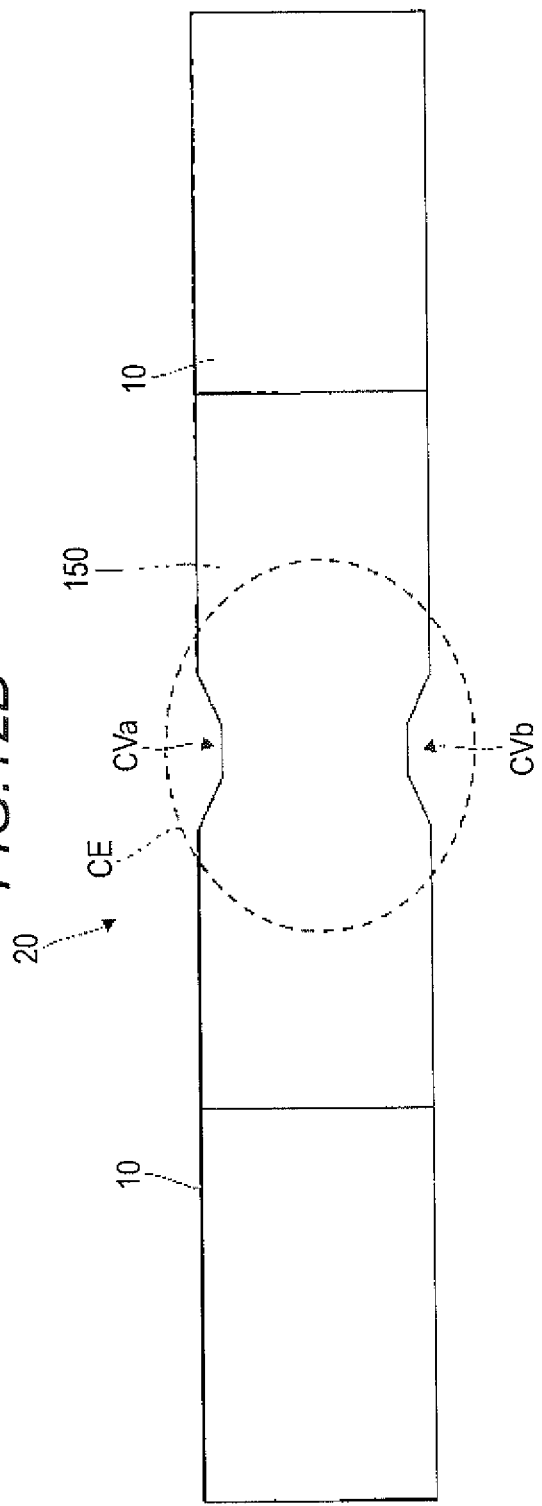
FIG. 12B is a front view.

In the foregoing embodiments, although the right and left light guide devices 20 are produced individually, the invention is not limited thereto, and for example, a configuration in which a light transmissive member is shared may be made. FIGS. 12A and 12B are conceptual diagrams illustrating a modification example of a light guide device.

In this example, a pair of right and left light guide members 10 and 10 and a light transmissive member 150 become an integrated optical member in which one light transmissive member 150 is sandwiched and connected between a pair of right and left light guide members 10 and 10, thereby functioning as the light guide device 20 whose right and left are integrated. In this case, it is possible to simply and accurately perform position alignment for binocular vision using the light transmissive member 150. For example, as shown in FIG. 12A, a center portion CE of the light transmissive member 150 is bent moderately, thereby specifying the right and left angles. For example, as shown in FIG. 12B, hollow portions CVa and CVb are provided at upper and lower ends in the center portion CE, whereby it is possible to use the hollow portions CVa and CVb for position alignment (position fixing) to attach and fix the light guide members 10 and 10 to the light transmissive member 150 in a manufacturing process, or as a location for providing the nose receiving part.

In the above description, although the light incidence part (second light guide part 12) and the light emission part (first light guide part 11) in the light guide device 20 is constituted of a single member, in addition to such a configuration, for example, a configuration may be made in which video light GL is made to directly enter a light guide part by total reflection without passing through a light reflected surface constituted of a light reflective film RM (see FIG. 2), or a configuration may be made in which the light guide member 10 of the light guide device 20 is separated into a light incidence part and a light guide part constituted of a prism and the like.

Figure 13:
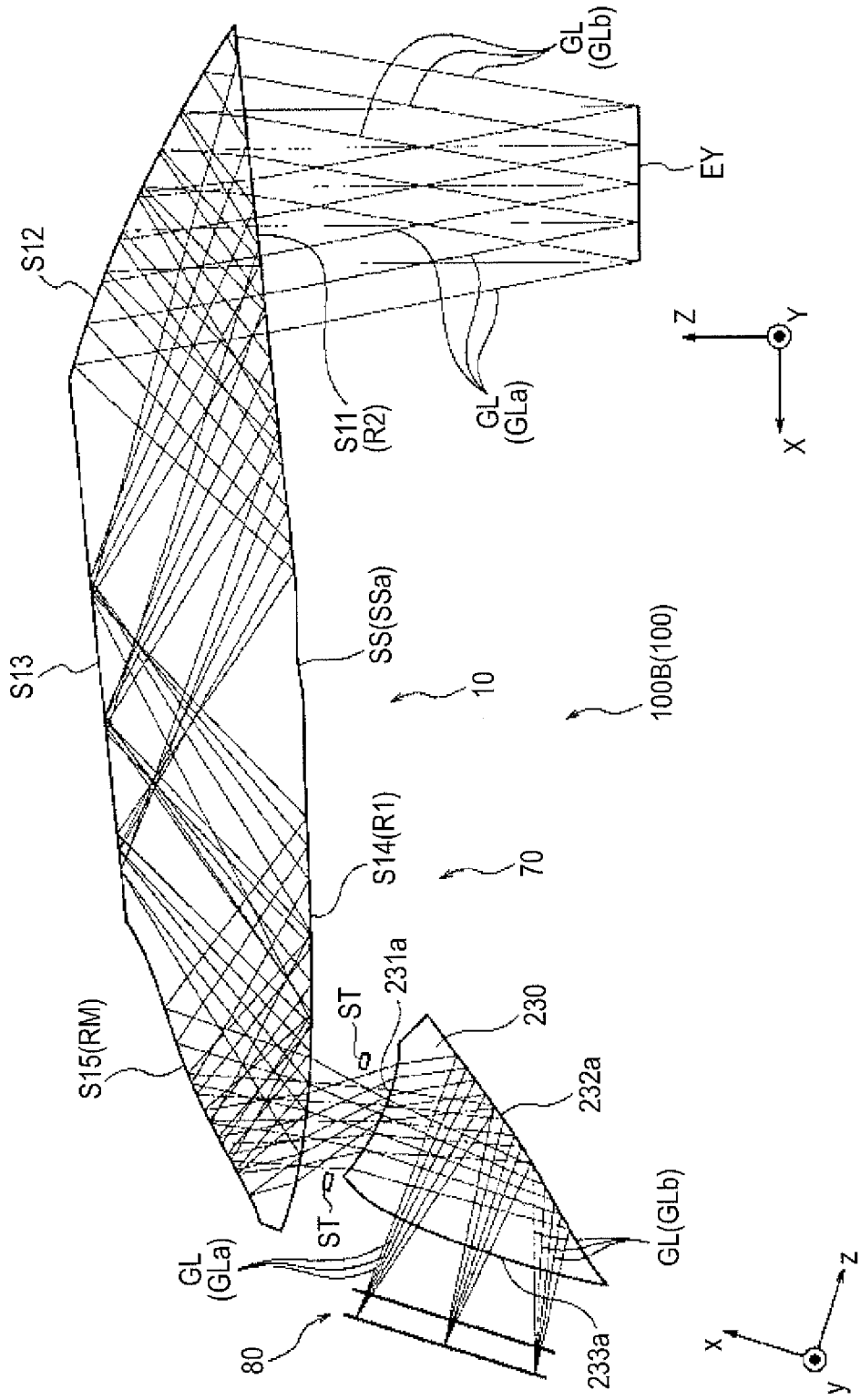
FIG. 13 is a plan view showing an optical path of a main body portion in another example of the virtual image display apparatus.

In the above description, although the projection lens 30 constituted of a plurality of lenses is employed as a projection optical system, the invention is not limited thereto, and for example, as shown in FIG. 13, a projection optical system may be constituted of a projection prism optical system 230 as a prim-shaped member. Even in this case, for example, of respective surfaces 231a to 233a contributing to optical path change in the projection prism optical system 230, the light incidence surface 233a which is provided at a position where the partial light fluxes GLa and GLb as components to reach the eye of the observer among the light fluxes of video light respectively emitted from the image display device 80 do not intersect each other is formed with a non-axisymmetric aspheric surface (free-form surface), whereby appropriate aberration correction becomes possible. The reflective surface 232a or the light emission surface 231a other than the light incidence surface 233a may be formed with a non-axisymmetric aspheric surface (free-form surface). In addition, in the drawing, although the projection prism optical system 230 as a projection optical system and the light guide device 20 (light guide member 10) are not connected and are separated from each other, these may be connected and integrated. For example, a stop ST which has a nonlinear shape corresponding to each partial light flux is provided at the downstream of the projection prism optical system 230, whereby it is possible to perform appropriate light shielding processing.

In the above description, in FIG. 6B or the like, although the stop ST which is provided diagonally has been described as a modification example, a way of arrangement in diagonal arrangement or the shape of the opening OP can take various aspects. For example, an inclination direction may be opposite to the case shown in FIG. 6B or the like. The arrangement or shape of the stop ST may be optimized according to various conditions, such as the shape of the light flux or difference in light to be captured. For example, it is possible to suitably change which of right and left in the horizontal direction in the shape of the opening OP increases.

In the above description, although the half-mirror layer (transflective film) 15 is formed in a horizontal square area, the contour of the half-mirror layer 15 may be appropriately changed according to usages and other specifications. The transmittance or reflectance of the half-mirror layer 15 may be changed according to usages and others.

In the above description, although the virtual image display apparatus 100 including a pair of display devices 100A and 100B has been described, a single display device may be provided. That is, a configuration may be made in which the projection see-through device 70 and the image display device 80 are provided only for either the right eye or the left eye to view an image with a single eye, instead of providing the set of the projection see-through device 70 and the image display device 80 for each of both the right eye and the left eye.

In the foregoing description, although the half-mirror layer 15 is a simple semitransmissive film (for example, a dielectric multilayer film), the half-mirror layer 15 may be replaced with a flat or curved hologram element. In addition, instead of the half-mirror layer 15, a plurality of minute reflective surfaces may be arranged on a curved surface, a Fresnel mirror may be used, or other diffraction elements may be used.

In the above description, although the light guide member 10 or the like extends in the horizontal direction in which the eyes EY are aligned, the light guide member 10 may be provided to extend in the vertical direction. In this case, the light guide member 10 has a parallel-arrangement structure, not the series-arrangement structure.

The connection portion SS may be provided in a plurality of locations according to the number of reflections of the reflective surface, or the number of reflective surfaces following the number of reflections, and the connection portion SS having the above-described shape and structure may be provided in a plurality of locations.

Figure 14:
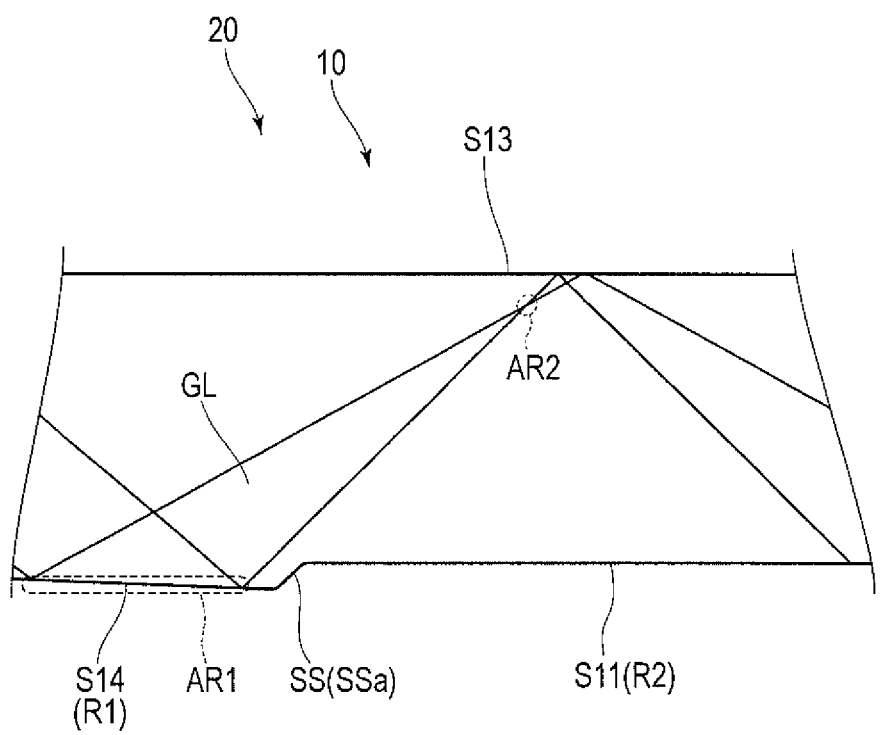
FIG. 14 is a diagram conceptually showing a part of the light guide member in an enlarged manner in an example of a state of light guide in the light guide device.

In the respective embodiments described above, for example, as conceptually shown in FIG. 14, at the time of light guide of video light GL in the light guide member 10 of the light guide device 20, a reflection position AR1 of a component of video light GL passing through near the connection portion SS on the first reflective surface R1 (fourth surface S14) and a position (imaging position) AR2 of an intermediate image of the component are separated from each other (in the case of the drawing, an intermediate image is formed (imaged) the third surface S13 side facing the fourth surface S14 or the first surface S11). In other words, the position AR2 of the intermediate image of video light GL reflected near the connection portion SS is separated from the connection portion SS, thereby bringing video light GL passing through the reflection position AR1 near the connection portion SS and the periphery thereof into a blurred state. With this, when video light GL passes through near the connection portion SS, even if unintended components enter due to reflection, scattering, or the like of outside light near the connection portion SS and are guided in the light guide member 10, it is possible to suppress the influence of the generation of ghost light due to these components. Specifically, the position AR2 of the intermediate image is separated from the reflection position AR1, whereby, even if the above-described unintended component enters, it is possible to make the component be guided and emitted at a position separated from the range of the optical path in which video light GL is guided and emitted with respect to the eye of the observer, and to make entered outside light hard to be viewed. Furthermore, video light GL is brought into the blurred state when passing through near the connection portion SS, whereby it is possible not to focus on the connection portion SS having a complicated uneven shape at the position of the eye of the observer, and to prevent the shape of the connection portion SS from being visually recognized. Contrary to the above-described case, if the position AR2 of the intermediate image is brought near the connection portion SS, it is considered that it is highly likely to be affected by a component due to outside light unintentionally entered video light GL. In contrast, as described above, in the respective embodiments, the reflection position AR1 of at least a component reflected near the connection portion SS out of video light GL reflected by the first reflective surface R1 (fourth surface S14) is separated from the position AR2 of the intermediate image, whereby it is possible to avoid such a case.

The exterior configuration of the virtual image display apparatus can take various aspects, and for example, the invention can be applied in a virtual image display apparatus 200 having an exterior shape shown in FIG. 15. The respective parts constituting the virtual image display apparatus 200 shown in the drawing represented by the same reference numerals as those in the virtual image display apparatus 100 shown in FIG. 1 have the same functional configurations, and thus, description thereof will not be repeated. That is, in regards to the light guide members 10 and 10 in the virtual image display apparatus 200, a light guide member having the same configuration as in the respective embodiments described above can be incorporated.

For example, as in a case where a projection prism (a prism-shaped projection optical system) is attached to a parallel flat plate-shaped light guide member to constitute an optical system, a connection portion (bonding portion) where two (or two or more) members are bonded may be made have a structure taken measures to outside light like this application.

The entire disclosure of Japanese Patent Application No. 2015-253153, filed Dec. 25, 2015 and 2016-212637, filed Oct. 31, 2016 are expressly incorporated by reference herein.

What is claimed is:
1. A virtual image display apparatus comprising:
a video element which generates video light; and
a light guide member which has a plurality of reflective surfaces, guides video light from the video element by reflecting video light by an inner surface thereof, and causes video light and outside world light to be visually recognized in an overlapping manner,
wherein the light guide member has a first reflective surface and a second reflective surface positioned on an emission side of video light from the first reflective surface as adjacent reflective surfaces provided on a side opposite to an incidence side of outside world light among the plurality of reflective surfaces, and has a connection portion connecting the first reflective surface and the second reflective surface,
in a location where the first reflective surface is more recessed than the second reflective surface to form a recess portion, the connection portion forms an inclined connection surface maintained at an inclination angle equal to or less than a predetermined value with respect to the second reflective surface according to the recess portion, and
wherein, in the connection portion, the inclination angle of the inclined connection surface with respect to the second reflective surface is determined according to the difference between the recess portion in the first reflective surface and the second reflective surface and the width of the connection portion in a light guide direction of the light guide member.

2. The virtual image display apparatus according to claim 1, wherein the width of the connection portion in the light guide direction of the light guide member is equal to or greater than 1.7 mm.

3. The virtual image display apparatus according to claim 1, wherein, in the connection portion, a thickness n of the first reflective surface in a protrusion direction with respect to the second reflective surface is maintained in a range of $-0.2 \leq n \leq 2$ mm over the entire connection portion.

4. The virtual image display apparatus according to claim 1, wherein, in a case where, in regard to the length of the light guide member in the light guide direction in a third reflective surface facing the first reflective surface and the second reflective surface among the plurality of reflective surfaces, a length on an emission side of video light from the center of the connection portion is $L_2$, an angle of refraction of outside light entering from the third reflective surface is $\alpha_1$, and the thickness of the light guide member in a direction vertical to the second reflective surface is D, a maximum inclination angle θ of the inclined connection surface with respect to the second reflective surface satisfies the following expression.

$$\theta < \frac{1}{2}\left(\tan^{-1}\left(\frac{L_2}{D}\right) - \alpha_1\right).$$

5. The virtual image display apparatus according to claim 1, wherein the maximum inclination angle of the inclined connection surface with respect to the second reflective surface is equal to or less than 6.9°.

6. The virtual image display apparatus according to claim 1, wherein the connection portion is sand-polished or blackened.

7. The virtual image display apparatus according to claim 1, wherein a reflective surface facing the first reflective surface and the second reflective surface has a portion which is sand-polished or blackened on the incidence side of video light from the connection portion in the light guide direction of the light guide member.

* * * * *